(12) United States Patent
Judd et al.

(10) Patent No.: US 9,868,229 B2
(45) Date of Patent: *Jan. 16, 2018

(54) METHODS OF INJECTION MOLDING AN ARTICLE

(71) Applicant: US SYNTHETIC CORPORATION, Orem, UT (US)

(72) Inventors: Robert Keith Judd, Spanish Fork, UT (US); Terry Mitchell Lewis, Spanish Fork, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/925,698

(22) Filed: Oct. 28, 2015

(65) Prior Publication Data

US 2016/0046042 A1 Feb. 18, 2016

Related U.S. Application Data

(63) Continuation of application No. 14/196,418, filed on Mar. 4, 2014, now Pat. No. 9,199,400, which is a
(Continued)

(51) Int. Cl.
*B29C 45/26* (2006.01)
*B29C 33/38* (2006.01)
(Continued)

(52) U.S. Cl.
CPC ............ *B29C 33/38* (2013.01); *B29C 33/565* (2013.01); *B29C 45/20* (2013.01); *B29C 45/26* (2013.01); *B29C 45/2711* (2013.01); *B29C 45/37* (2013.01); *B29C 45/401* (2013.01); *B29C 33/301* (2013.01); *B29C 33/3842* (2013.01);
(Continued)

(58) Field of Classification Search
CPC ....... C22C 26/00; B29C 45/37; B29C 33/565; B29C 33/38
See application file for complete search history.

(56) References Cited

U.S. PATENT DOCUMENTS 1,551,751 A 9/1925 Kozak
1,597,927 A 8/1926 Simons
(Continued)

FOREIGN PATENT DOCUMENTS

DE 37 12 128 10/1998
JP H06106543 4/1994
(Continued)

OTHER PUBLICATIONS

U.S. Appl. No. 14/196,418, dated Nov. 11, 2015, Issue Notification.
(Continued)

*Primary Examiner* — Jill Heitbrink
(74) *Attorney, Agent, or Firm* — Dorsey & Whitney LLP

(57) ABSTRACT

Embodiments of the invention relate to injection mold components, assemblies, and molding system that include superhard materials. Such injection mold components, assemblies, and systems may decrease wear of certain injection mold components, which may result in improved productivity of the injection mold and molding systems that utilize such components.

20 Claims, 14 Drawing Sheets

Related U.S. Application Data continuation of application No. 13/463,471, filed on May 3, 2012, now Pat. No. 8,702,412, which is a continuation-in-part of application No. 13/005,212, filed on Jan. 12, 2011, now Pat. No. 8,512,023.

(51) Int. Cl.

| | | |
|---|---|---|
| *B29C 33/56* | (2006.01) | |
| *B29C 45/37* | (2006.01) | |
| *B29C 45/27* | (2006.01) | |
| *B29C 45/20* | (2006.01) | |
| *B29C 45/40* | (2006.01) | |
| B29C 33/30 | (2006.01) | |

(52) U.S. Cl.
CPC .... *B29K 2907/045* (2013.01); *B29K 2909/04* (2013.01)

(56) References Cited

U.S. PATENT DOCUMENTS

| | | | |
|---|---|---|---|
| 3,110,625 A | 11/1963 | Bettner | |
| 3,823,598 A | 7/1974 | Freeman | |
| 4,046,103 A | 9/1977 | Yakuboff | |
| 4,281,617 A | 8/1981 | Bevers et al. | |
| 4,426,954 A | 1/1984 | Keller | |
| 4,454,657 A | 6/1984 | Tasumi | |
| 4,534,934 A | 8/1985 | Cho | |
| 4,624,817 A | 11/1986 | Gusack et al. | |
| 4,643,741 A | 2/1987 | Yu et al. | |
| 4,783,041 A | 11/1988 | Sakaida et al. | |
| 5,379,853 A | 1/1995 | Lockwood et al. | |
| 5,449,408 A | 9/1995 | Koaizawa et al. | |
| 5,741,446 A | 4/1998 | Tahara et al. | |
| 5,849,083 A | 12/1998 | Milliman | |
| 5,851,137 A | 12/1998 | Shave et al. | |
| 6,220,375 B1 | 4/2001 | Butcher et al. | |
| 6,314,836 B1 | 11/2001 | Einset et al. | |
| 6,402,787 B1 | 6/2002 | Pope et al. | |
| 6,410,877 B1 | 6/2002 | Dixon et al. | |
| 6,497,727 B1 | 12/2002 | Pope et al. | |
| 6,517,583 B1 | 2/2003 | Pope et al. | |
| 6,810,712 B2 | 11/2004 | Goto | |
| 6,817,550 B2 | 11/2004 | Taylor et al. | |
| 6,969,313 B2 | 11/2005 | Sung | |
| 7,060,641 B2 | 6/2006 | Qian et al. | |
| 7,134,868 B2 | 11/2006 | Babin et al. | |
| 7,172,142 B2 | 2/2007 | Taylor | |
| 7,461,978 B2 | 12/2008 | Pope et al. | |
| 7,540,181 B1 | 6/2009 | Memmott | |
| 7,628,234 B2 | 12/2009 | Middlemiss | |
| 7,665,898 B2 | 2/2010 | Pope et al. | |
| 7,678,325 B2 | 3/2010 | Gardinier | |
| 8,512,023 B2* | 8/2013 | Judd | B29C 33/565 425/121 |
| 8,678,801 B2* | 3/2014 | Judd | B29C 33/565 425/121 |
| 8,702,412 B2* | 4/2014 | Judd | B29C 33/565 425/121 |
| 2003/0189114 A1* | 10/2003 | Taylor | B05B 1/00 239/602 |
| 2004/0211222 A1 | 10/2004 | Hosoe | |
| 2005/0112231 A1* | 5/2005 | Babin | B29C 45/278 425/549 |
| 2006/0093700 A1 | 5/2006 | Naito et al. | |
| 2006/0165973 A1* | 7/2006 | Dumm | B29C 33/56 428/323 |
| 2007/0157670 A1 | 7/2007 | Sung | |
| 2008/0090099 A1 | 4/2008 | Ramm et al. | |
| 2008/0145472 A1 | 6/2008 | Oikawa et al. | |
| 2008/0154380 A1 | 6/2008 | Dixon et al. | |
| 2009/0152018 A1 | 6/2009 | Sani | |
| 2009/0272583 A1 | 11/2009 | Pope | |
| 2010/0084196 A1 | 4/2010 | Bertagnolli et al. | |
| 2011/0045124 A1 | 2/2011 | Zuraw | |
| 2012/0213884 A1 | 8/2012 | Judd | |
| 2014/0145373 A1 | 1/2014 | Judd | |
| 2014/0183788 A1 | 7/2014 | Judd | |

FOREIGN PATENT DOCUMENTS

| | | |
|---|---|---|
| JP | H08132443 | 5/1996 |
| JP | 11034068 | 2/1999 |
| JP | 2001047158 | 2/2001 |
| WO | WO 2003083148 | 10/2003 |
| WO | WO 2005068114 | 7/2005 |
| WO | WO 2012096819 | 7/2012 |

OTHER PUBLICATIONS

U.S. Appl. No. 14/169,962, dated Nov. 4, 2015, Issue Notification.
Overview of: Polycrystalline Diamond: Manufacture, Wear Mechanisms, and Implications for bit Design. Sneddon, et al. Petroleum Technology vol. 40, No. 12, Dec. 1998, Pgs: 1593-1601.
International Search Report and Written Opinion from International Application No. PCT/US2012/020266 dated Apr. 10 2012.
International Search Report and Written Opinion from International Application No. PCT/US2013/039101 dated Oct. 25, 2013.
11580817 Aug. 22, 2007 Office Action.
11580817 Mar. 24, 2008 Office Action.
11580817 Jun. 5, 2008 Office Action.
11580817 Oct. 7, 2008 Office Action.
11580817 Feb. 26, 2009 Notice of Allowance.
11580817 May 13, 2009 Issue Notification.
13005212 Jun. 7, 2012 Office Action.
13005212 Oct. 4, 2012 Office Action.
13/005212 Jan. 31, 2013 Notice of Allowance.
13/005212 Apr. 19, 2013 Notice of Allowance.
13/005212 Jul. 31, 2013 Issue Notification.
13/463471 Aug. 1, 2013 Office Action.
13/463471 Dec. 4, 2013 Notice of Allowance.
13/463471 Apr. 2, 2014 Issue Notification.
13/788952 Jun. 26, 2013 Office Action.
13/788952 Nov. 1, 2013 Notice of Allowance.
13/788952 Mar. 5, 2014 Issue Notification.
14/196418 Mar. 27, 2015 Office Action.
14/196418 Jul. 21, 2015 Notice of Allowance.
14/196418 Aug. 10, 2015 Notice of Allowance.
14/169962 Mar. 27, 2015 Office Action.
14/169962 Jul. 16, 2015 Notice of Allowance.
14/169962 Aug. 10, 2015 Notice of Allowance.
14/169962 Oct. 22, 2015 Notice of Allowance.

* cited by examiner

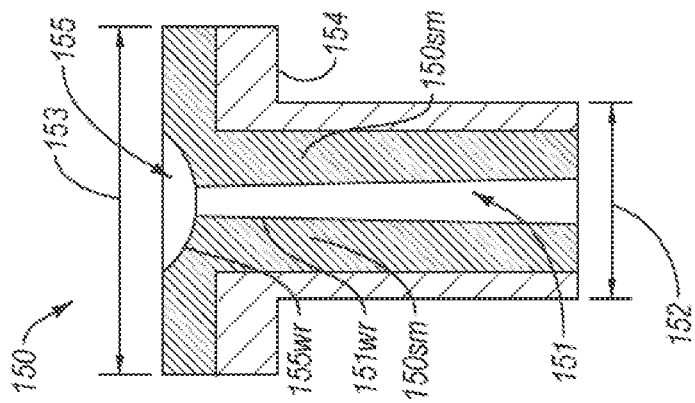
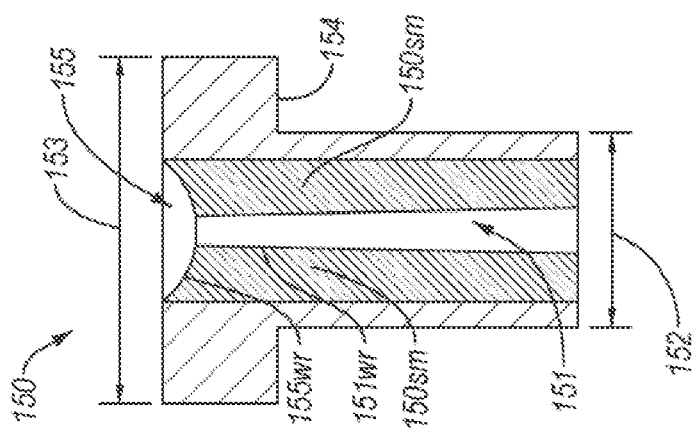
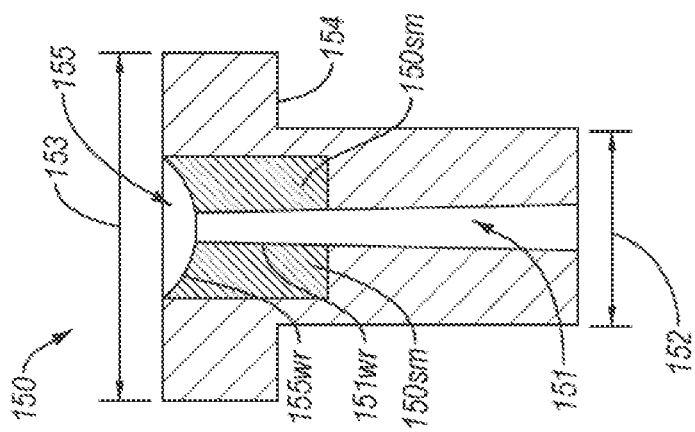

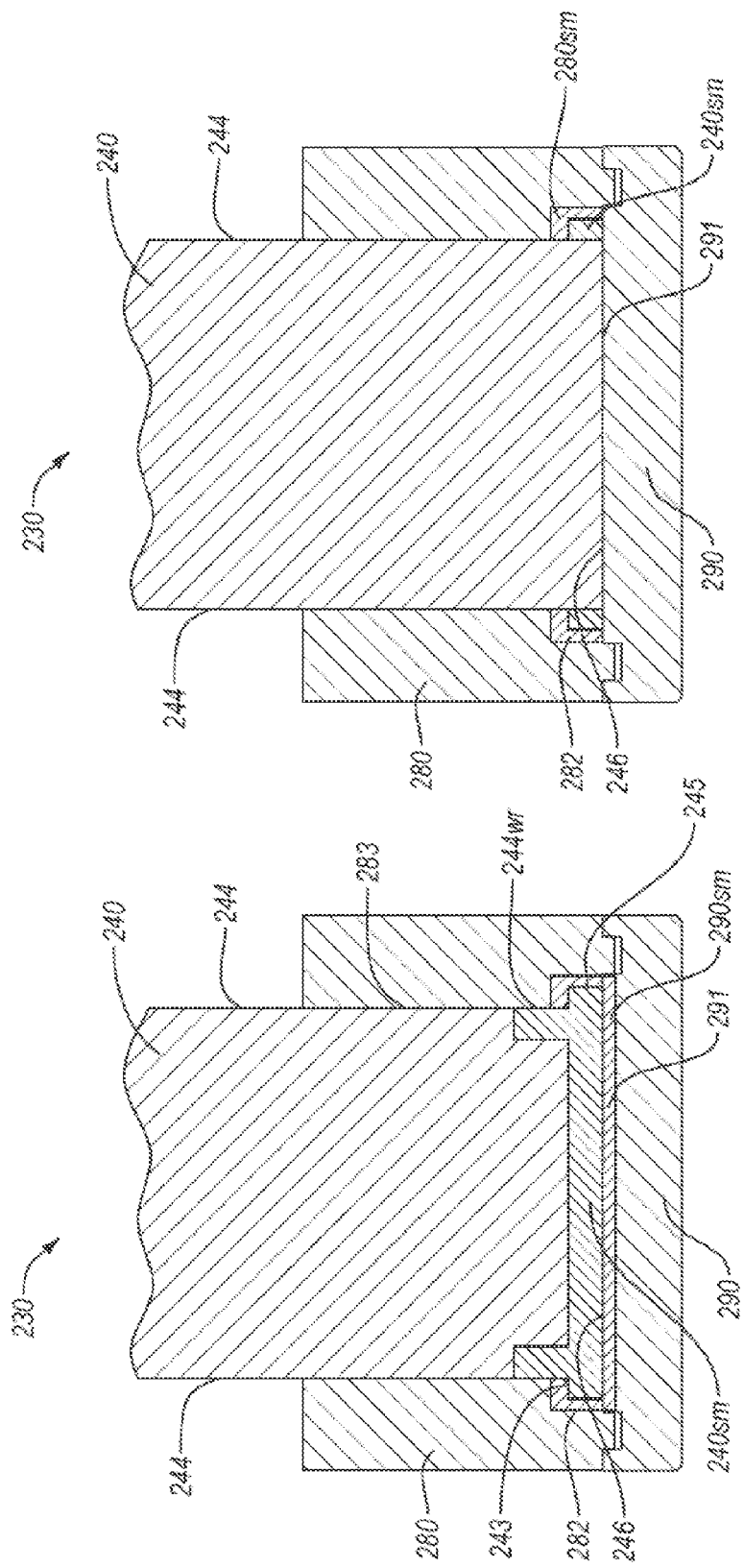

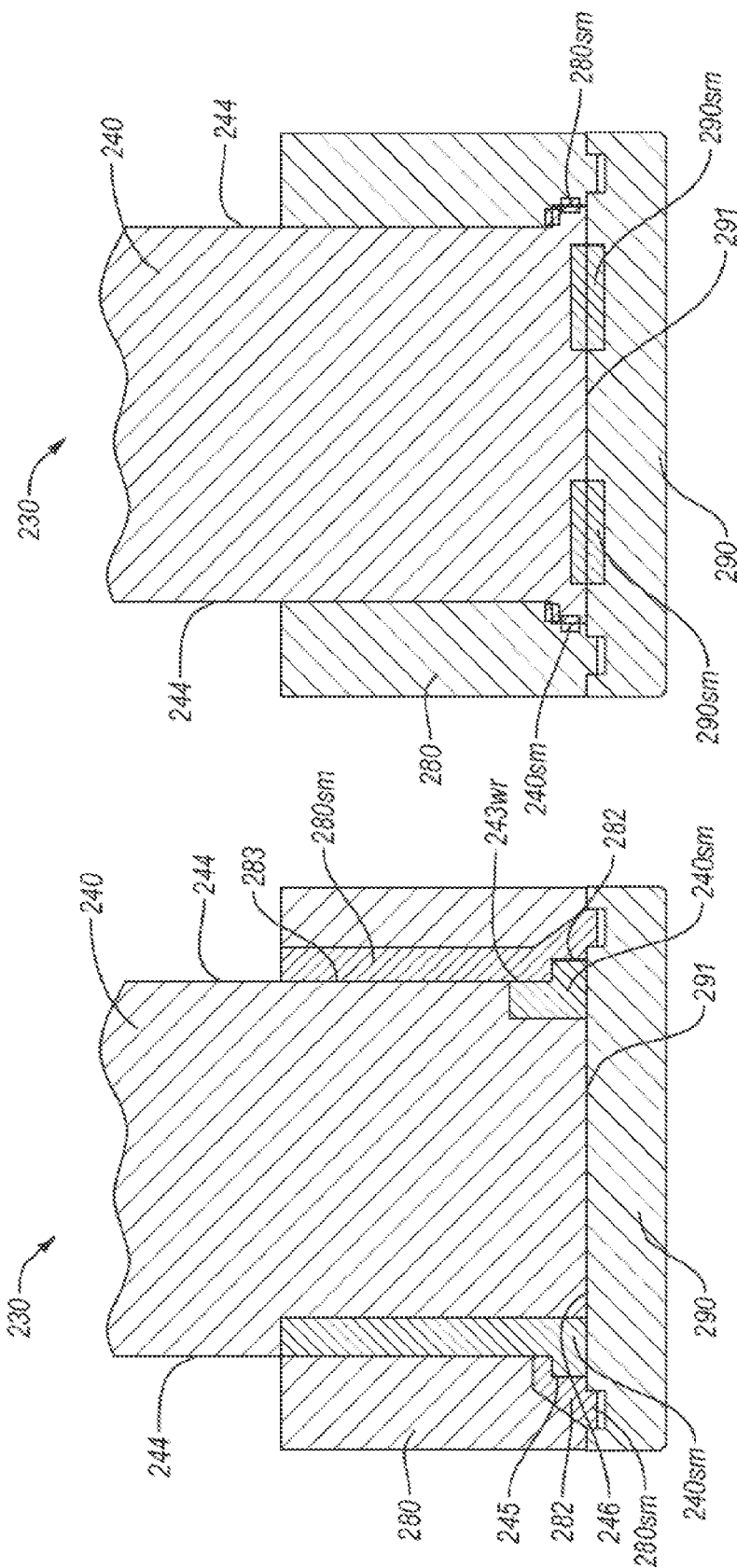

METHODS OF INJECTION MOLDING AN ARTICLE

CROSS-REFERENCE TO RELATED APPLICATIONS

This application is a continuation of U.S. patent application Ser. No. 14/196,418 filed on 4 Mar. 2014, which is a continuation of U.S. patent application Ser. No. 13/463,471 filed on 3 May 2012 (now U.S. Pat. No. 8,702,412 issued on 22 Apr. 2014), which is a continuation-in-part of U.S. patent application Ser. No. 13/005,212 filed on 12 Jan. 2011 (now U.S. Pat. No. 8,512,023 issued on 20 Aug. 2013), the disclosure of each of which is incorporated herein, in its entirety, by this reference.

BACKGROUND

Injection molding processes have relatively widespread use and may be employed to produce a wide variety of parts. For instance, injection molded parts may range from only a few millimeters in size to parts that are several meters wide. Injection molding also may be used produce components that have various geometries, complexity of which may vary from simple to highly intricate in detail. Furthermore, injection molding processes may produce parts from various materials, including but not limited to thermoplastic polymers, aluminum alloys, zinc alloys, etc.

Oftentimes, molds used to manufacture injection molded parts (i.e., injection molds) may be relatively expensive. Consequently, injection molding is most commonly used to manufacture parts in large quantities. This may allow the cost of the injection mold to be amortized over thousands or even hundreds of thousands of molded parts.

Typical molds are constructed from metallic materials, such as steel, aluminum, brass, copper, etc. Usability of the mold may vary based on the materials used therein. For example, use of softer and/or less wear-resistant metals, which may exhibit increased wear in an injection mold, may lead to unusable parts produced by the mold. Ordinarily, material wear results from "cycling" the mold—i.e., closing the mold, injecting molten molding material, opening the mold, and/or ejecting or removing the parts. The rate and/or amount of wear may depend on the part geometry, molding material used in the process, frequency and number of cycles, and other factors present during the operation of the mold.

Additionally, an injection mold may include certain components that may exhibit more wear than other components, due to the nature of the operation of the mold. Thus, in some instances, a typical mold may require repair or replacement where increased wear may lead to failure of such components.

SUMMARY

Various embodiments of the invention are directed to injection mold assemblies and components that comprise a superhard material, as well as injection molding system that may utilize such injection mold assemblies and components. Superhard materials may be arranged and formed in any number of sizes and configurations. In some embodiments, superhard materials may be available in limited sizes. Hence, multiple segments may be used to enable forming desired surface sizes and configurations, notwithstanding possible limitations in the size of available superhard materials. Superhard materials also may be located along all or portion of one or more surfaces of the injection mold component, to form one or more wear-resistant surface, which may provide increased resistance to wear for such surfaces of the injection mold component.

According to one embodiment, an injection mold component for use in an injection mold includes a substrate and a superhard material bonded to the substrate that forms a wear-resistant surface. The wear-resistant surface is moveable within the injection mold, and/or the wear-resistant surface defines at least a portion of a conduit for communicating a molding material flows into the injection mold.

According to another embodiment, an injection mold assembly includes a first mold plate, a second mold plate, and one or more molding elements located on one or more of the first or second mold plates. The injection mold assembly also includes an injection mold component located on at least one of the first mold plate, on the second mold plate, or on the molding element. The injection mold component includes a superhard material forming at least a portion of a surface of the injection mold component, wherein the superhard material is bonded to a substrate.

According to yet another embodiment, an injection molding system includes an injection molding machine and an injection mold operably coupled to the injection molding machine. The injection mold includes a stationary portion, a moving portion, and one or more molding elements located on the stationary and/or on the moving portions. The injection mold also includes an injection mold component located on the stationary portion and/or on the moving portion. The injection mold component includes a superhard material forming a wear-resistant surface on the injection mold component. The superhard material is bonded to a substrate. The injection molding machine is configured to move the moving portion. The injection molding machine is also configured to inject molding material into the injection mold via a conduit at least partially defined by the wear-resistant surface of the injection mold component; or the wear-resistant surface is moveable within the injection mold.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 3A is a cross-sectional view of sprue bushing of an injection mold in accordance with one embodiment of the invention;

FIG. 3B is a cross-sectional view of a sprue bushing of an injection mold in accordance with another embodiment of the invention;

FIG. 3C is a cross-sectional view of a sprue bushing of an injection mold in accordance with yet another embodiment of the invention;

FIG. 6B is a cross-sectional view of the undercut relief system of FIG. 6A taken along line 6B-6B thereof;

FIG. 6C is a cross-sectional view of an undercut relief system of an injection mold in accordance with another embodiment of the invention;

FIG. 6D is a cross-sectional view of an undercut relief system of an injection mold in accordance with yet another embodiment of the invention;

FIG. 6E is a cross-sectional view of an undercut relief system of an injection mold in accordance with another embodiment of the invention;

DETAILED DESCRIPTION

Various embodiments of the invention are directed to injection mold assemblies and components that comprise a superhard material, as well as injection molding system that may utilize such injection mold assemblies and components. Superhard materials may be arranged and formed in any number of sizes and configurations. In some embodiments, superhard materials may be available in limited sizes. Hence, multiple segments may be used to enable forming desired surface sizes and configurations, notwithstanding possible limitations in the size of available superhard materials. Superhard materials also may be located along all or portion of one or more surfaces of the injection mold component, to form one or more wear-resistant surface, which may provide increased resistance to wear for such surfaces of the injection mold component.

Figure 1:
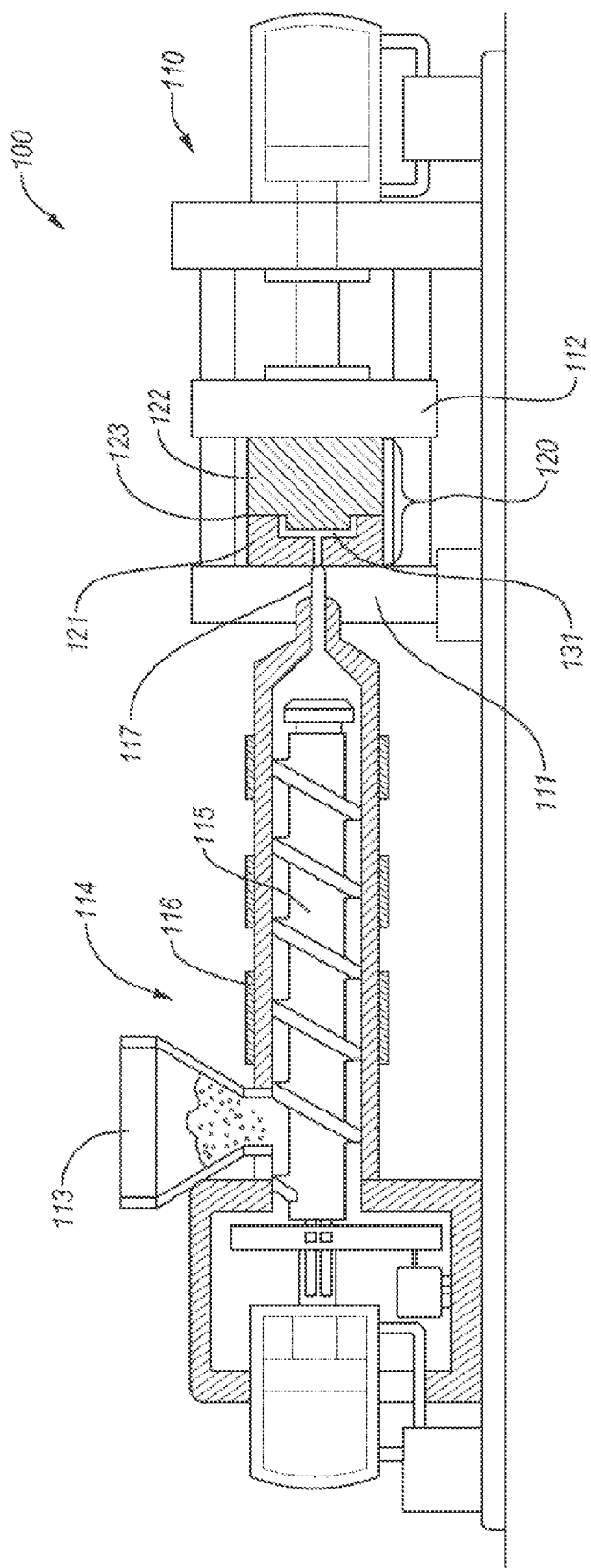
FIG. 1 is a schematic cross-sectional view of an injection molding machine and an injection mold, which may utilize any of the injection mold components disclosed herein.

There are numerous types of injection molding machines and techniques available for manufacturing injection molded parts. In particular, the injection molding machine may inject, for example, molten thermoplastics, thermosets, elastomers, aluminum alloys, and zinc alloys into an injection mold, to manufacture various parts from such materials or combinations thereof. Additionally, the injection molding machine may inject thermoplastics, thermosets, elastomers, or combinations thereof that incorporate metallic powder, thereby producing a "green" part, which may allow the manufacturer to make metal parts by removing the polymer material from the "green part" and sintering the metallic powder. FIG. 1 illustrates an injection molding system 100, which may include an injection molding machine 110 and an injection mold 120 (shown in a closed position). Although the particular configuration or operation of the injection molding machine 110 may vary in some regards with respect to other available machines or processes, the injection molding machine 110 may be a typical machine used for manufacturing injection molded parts.

The injection molding machine 110 may include a front platen 111 and a back platen 112. The back platen 112 may move with respect to the front platen 111, which may cause the injection mold 120 to open. In particular, the injection mold 120 may have a stationary portion 121 and a moving portion 122, which may define a parting line 123 (i.e., the line (or one or more planes) along which the injection mold 120 splits to open). The stationary portion 121 of the injection mold 120 may be secured to the front platen 111 and the moving portion 122 may be secured to the back platen 112. Accordingly, movement of the back platen 112 in a direction away from the front platen 111 may cause the moving portion 122 of the injection mold 120 to move away from the stationary portion 121, thereby opening the injection mold 120 along the parting line 123. Similarly, movement of the back platen 112 toward the front platen 111 may cause the injection mold 120 to close.

The injection molding machine 110 also may include a material hopper 113 and an injection system 114, which may supply molten molding material into the injection mold 120.

More particularly, molding material (e.g., plastic pellets) may be added into the material hopper 113 and fed into the injection system 114. In one embodiment, the injection system 114 may include a screw 115 that may rotate within a barrel. Optionally, one or more heaters 116 may surround the barrel to heat and/or at least partially or completely melt the molding material.

The melted molding material may be conveyed by the screw 115, which may be a reciprocating screw, toward the injection mold 120. The molten molding material may be injected into the injection mold 120 through an injection nozzle 117. It should be noted that other configurations of the injection molding machine 110 may be used to manufacture molded parts. For instance, the injection system 114 may include a plunger, which may replace or may be incorporated into the screw 115, and which may inject the molten molding material into the injection mold 120.

Figure 2:
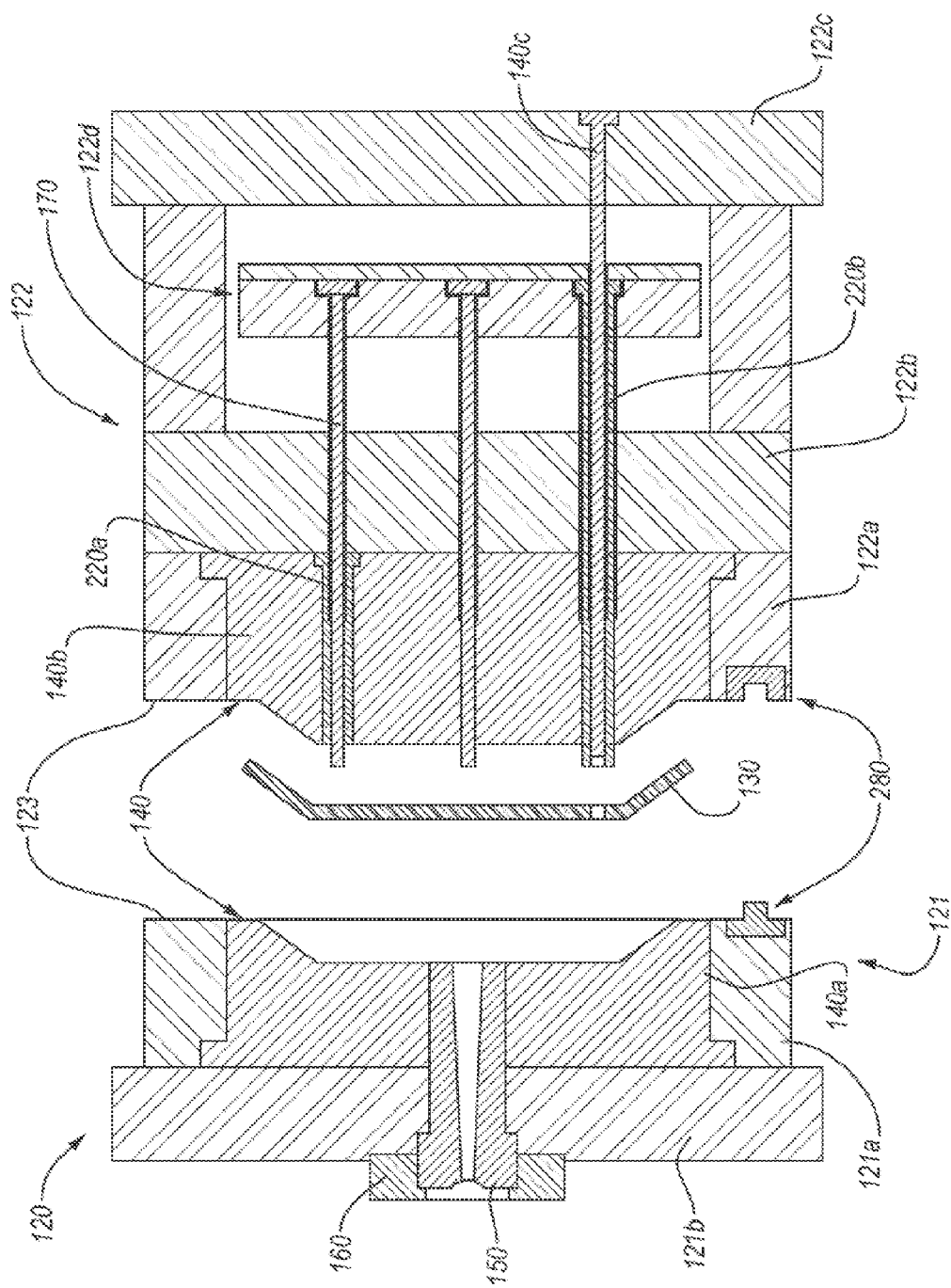
FIG. 2 is a cross-sectional view of an injection mold in accordance with one embodiment of the invention.

Once the injection mold 120 is in a fully closed position (as shown in FIG. 1), molten molding material may be injected into the injection mold 120. More specifically, the molten material may fill a molding volume 131 within the injection mold 120. Subsequently, as shown in FIG. 2, the molten molding material may cool and at least partially solidify to form a part corresponding to the molding volume 131. When the molten molding material forming the part has cooled to a desired temperature, the injection mold 120 may be opened, by moving the back platen 112 away from the front platen 111 (as described above), and the part may be ejected or removed from the injection mold 120.

To produce the part, the injection mold 120 may incorporate various molding elements, which may have necessary shapes and sizes to form a part 130. For example, as illustrated in FIG. 2, the injection mold 120 may include one or more molding elements 140, such as molding elements 140a, 140b, 140c (which may include a cavity, a core, a core pin, core inserts, etc.) that assemble to define the molding volume 131. A "molding element" refers to any portion of the injection mold 120 that forms at least a portion of the part 130 (i.e., portion(s) of the injection mold 120 that define the molding volume 131). Thus, to produce multiple parts in a single cycle, the injection mold 120 may include multiple sets of molding elements 140, which may be substantially identical (to produce the same parts) or may vary, for production of different parts in the single cycle. A "set of molding elements" refers to the molding elements 140 that, when combined, form or define the molding volume 131 (see FIG. 1), which may accept molten material and form the part 130.

As described above, the injection mold 120 may be secured in the injection molding machine 110. More specifically, the injection mold 120 may be secured to the front platen 111 and back platen 112. For instance, the nonmoving portion 121 of the injection mold 120 may have one or more clamping grooves that may accommodate clamps for securing the nonmoving portion 121 to the front platen 111 of the injection molding machine 110. For example, the nonmoving portion 121 may include one or more plates, such as a first plate 121a and a top clamping plate 121b, which may form such clamping grooves. The nonmoving portion 121 also may include an overhang that may accommodate clamps, bolt holes that may accept bolts for securing the nonmoving portion 121 to the front platen 111, and/or other features that may be used to secure the nonmoving portion 121 to the front platen 111, which should be appreciated by those skilled in the art.

The nonmoving portion 121 also may include a sprue bushing 150, which may channel the molten molding material into the injection mold 120. For example, the injection nozzle 117 may have a spherical tip which may contact a sphere of the same or similar radius on the sprue bushing 150. Subsequently, the molten molding material may flow from the injection system 114 of the injection molding machine 110, through the injection nozzle 117, through the sprue bushing 150, and into the injection mold 120. In some instances, the nonmoving portion 121 also may include a locating ring 160, which may aid in aligning the injection mold 120 and/or the sprue bushing 150 with the injection molding machine 110 as well as with the injection nozzle 117.

The moving portion 122 of the injection mold 120 may be connected to the back platen 112 of the injection molding machine 110. Similar to the nonmoving portion 121, the moving portion 122 may incorporate a clamping groove or other features that may allow the manufacturer to connect the moving portion 122 of the injection mold 120 to the back platen 112 of the injection molding machine 110. Furthermore, the moving portion 122 may include a second plate 122a that may secure or incorporate the molding element 140b. The moving portion 122 of the injection mold 120 also may include a support plate 122b, which may provide support to the second plate 122a and additional rigidity to the injection mold 120.

Additionally, the moving portion 122 and the nonmoving portion 121 of the injection mold 120 may include leader pins and corresponding bushings (not shown), which may aid in aligning the moving portion 122 and the nonmoving portion 121 during the opening and closing of the injection mold 120. In some embodiments, it may be desirable to provide additional alignment mechanisms, to further align the moving and the nonmoving portions 122, 121 of the injection mold 120 as well as to prevent undesirable movement of the nonmoving and moving portions 121, 122 during injection of the molding material. For example, as further described below, the injection mold 120 may include interlock pairs 280, which may comprise male and corresponding female interlock portions. Furthermore, clearance between the male and the corresponding female interlock portions may be substantially smaller than the clearance between the leader pins and corresponding bushings. For instance, the clearance between the male and female interlocks may be in the range of 0.0002 inch to 0.0005 inch per side.

The injection mold 120 also may incorporate an ejection mechanism, which may eject the part 130 after the part 130 has cooled down to a desired temperature. In particular, the ejection mechanism may include an ejector housing 122c and ejector plates 122d. For example, the ejector plates 122d may connect to an ejection system of the injection molding machine 110, which may move the ejector plates 122d toward the front platen 111. The ejector plates 122d, in turn, may secure one or more ejector pins 170, which may move together with the ejector plates 122d and eject the part 130 out of the injection mold 120.

In some embodiments, as further described below, the injection mold 120 also may incorporate one or more ejector sleeves, such as ejector sleeves 220a, 220b. More particularly, the ejector sleeve 220a may guide the ejector pin 170 through the molding element 140b. Hence, a portion (e.g., a top surface) of the ejector sleeve 220a may contact the part 130 and may at least in part form the molding volume 131.

In at least one embodiment, a core pin 140c may be secured in the ejector housing 122c. The core pin 140c may at least in part define the molding volume 131 (e.g., the core pin 140c may form a hole in the part 130). The ejector sleeve 122*b* may provide additional uniformity during ejection of the part 130. More specifically, the ejector plates 122*d* also may secure one or more ejector sleeves, such as the ejector sleeve 122*b*, which may slide about the core pin 140*b*, thereby aiding in ejection of the part 130.

It should be appreciated that the injection mold 120 may include all, some, and/or additional molding elements, plates, and/or devices described herein. For instance, the injection mold 120 may have no ejector housing or ejector plates, and the manufacturer may choose to remove the parts with a robotic arm (or manually) to avoid ejector pin marks on the parts. Additionally or alternatively, the injection mold 120 may also include additional plates and/or devices, not described herein, which may be necessary for operation. For example, in lieu of ejector pins, the manufacturer may choose to use a stripper plate (where applicable), which may strip the part 130 from the molding element 140*b*. Thus, it should be noted that components described herein may be used in the injection mold 120 of any configuration or design.

In some instances, the part 130 may include undercuts or undercutting portions, which may need to be relieved before the part 130 may be ejected from the injection mold 120. In particular, one or more slides or lifters may be used to relieve undercuts and allow the part 130 to be ejected, as described in more detail below. A slide may move substantially orthogonally with respect to the undercut, thereby removing at least a portion of the molding element 140 away from the part 130. A lifter may move in a direction of ejection (i.e., toward the front platen 111) and orthogonally to the undercut—thus, ejecting the part while relieving the undercut.

In at least one embodiment, one or more surfaces of one or more components comprising the injection mold 120 may include one or more layers of superhard material. More particularly, one or more layers of superhard material may form one or more wear-resistant surfaces on the injection mold components. An "injection mold component" refers to any component and/or element comprising an injection mold. Also, as used herein, the term "superhard," or the phrase "superhard material," refers to any material having a hardness that is at least equal to the hardness of tungsten carbide. Furthermore, element numbers denoted with letters "sm" identify superhard material in particular embodiments. It should be noted that so denoted superhard material may be any superhard material disclosed herein. Similarly, element numbers denoted with letters "wr" identify wear-resistant surface that may be formed by one or more layers of superhard material on a particular injection mold component.

In some embodiments, one or more substrates may be bonded to the injection mold components. The substrates may be a cobalt-cemented tungsten carbide substrate or other carbide substrate. Additionally, the layer of superhard material forming the wear-resistant surface may be natural diamond, polycrystalline diamond, polycrystalline cubic boron nitride, silicon carbide, diamond grains bonded together with silicon carbide, or any combination of the preceding materials. Furthermore, the superhard material may be thermally-stable diamond in which a catalyst material (e.g., iron, nickel, cobalt, or alloys thereof) has been at least partially depleted from a surface or volume of the polycrystalline diamond using, for example, a leaching process. A cemented carbide substrate (e.g., cobalt cemented, nickel cemented, cemented using alloys of cobalt, or cemented using alloys of nickel) may comprise any suitable carbide, such as tungsten carbide, tantalum carbide, vanadium carbide, niobium carbide, chromium carbide, titanium carbide, or combinations of the foregoing carbides.

In at least one embodiment, the superhard material includes one or more polycrystalline diamond compacts (PDCs). For instance, the substrate may comprise cobalt-cemented tungsten carbide and the layer of superhard material may include polycrystalline diamond. Such structures may be fabricated by subjecting diamond particles, placed on or proximate to a cobalt-cemented tungsten carbide substrate, to a high-pressure/high-temperature (HPHT) sintering process. The diamond particles with the cobalt-cemented tungsten carbide substrate may be HPHT sintered at a temperature of at least about 1000° Celsius (e.g., about 1100° C. to about 1600° C.) and a pressure of at least about 4 GPa (e.g., about 5 GPa to about 9 GPa) for a time sufficient to consolidate and form a coherent mass of bonded diamond grains. In such a process, the cobalt from the cobalt-cemented tungsten carbide substrate sweeps into interstitial regions between the diamond particles to catalyze growth of diamond between the diamond particles. More particularly, following HPHT processing, the superhard material may comprise a matrix of diamond grains that are bonded with each other via diamond-to-diamond bonding (e.g., $sp^3$ bonding), and the interstitial regions between the diamond grains may be at least partially occupied by cobalt or another catalyst, thereby creating a network of diamond grains with interposed cobalt or other catalyst, otherwise known as polycrystalline diamond (PCD).

In some embodiments, the catalyst used for forming the PCD superhard material may be a metal-solvent catalyst, such as cobalt, nickel, iron, or alloys thereof. A thermal stability of such PCD superhard material may be improved by leaching the metal-solvent catalyst from of the PCD. Leaching may be performed in a suitable acid, such as aqua regia, nitric acid, hydrofluoric acid, or combination thereof, so that the leach PCD superhard material is substantially free of metal-solvent catalyst. Furthermore, the PCD superhard material may be entirely or partially. Generally, a maximum leach depth may be greater than 250 μm. For example, the maximum leach depth may be greater than 300 μm to about 425 μm, greater than 350 μm to about 400 μm, greater than 350 μm to about 375 μm, about 375 μm to about 400 μm, or about 500 μm to about 650 μm.

The superhard material comprising the PCD also may allow operation of various components of the injection mold without lubricants. Thus, incorporating superhard material into injection mold components can avoid contamination of molded parts with lubricants, which, otherwise, may be required for proper operation of the injection mold in order to preserve the life of the injection mold components. In other words, incorporating PCD superhard material into the injection mold components may replace lubricants and may maintain the life and usefulness of the injection mold components. Lubricant-free operation may be particularly advantageous in molding medical products and/or components thereof (as well as other clean products and components), which may have more rigorous requirements of environment cleanliness than other molded products.

In one or more embodiments, the substrate may be omitted, and the injection mold components may include one or more layers of superhard materials such as cemented tungsten carbide or polycrystalline diamond. Also, the layer of superhard material (e.g., diamond) may be deposited, using chemical vapor deposition (CVD), physical vapor deposition, plasma-assisted chemical vapor deposition, or other deposition techniques. Example methods for depositing a superhard material are described in U.S. Pat. No. 7,134,868, the disclosure of which is incorporated by reference herein in its entirety.

The layer of superhard material may exhibit a substantially uniform thickness (i.e., with substantially uniform thickness) or a non-uniform thickness. Additionally or alternatively, the layer of superhard material may be continuous/contiguous or may be interrupted or formed from multiple segments. Furthermore, in some embodiments, a thickness of the layer of superhard material that forms a wear-resistant surface may be in the range of about 0.010 inches to about 0.200 inches. Additionally or alternatively, the thickness of the layer of superhard material may be in the range from about 0.020 inches to about 0.120 inches, about 0.040 inches to about 0.100 inches, and about 0.060 inches to about 0.090 inches. Moreover, the thickness of the superhard layer may be greater than about 0.200 inches.

In some embodiments, the superhard material may form more than one wear-resistant surface on a particular injection mold component. For example, as further described below, the superhard material may form two wear-resistant surfaces disposed at approximately 90° with respect to each other. Similarly, the superhard material may have one or more bonding surfaces. Furthermore, the boding surfaces also may be continuous or interrupted; for example, an entire surface of the superhard material may be bonded to the substrate or only a portion thereof. Hence, the superhard material may have more than one thickness measurements, depending on the number of bonding surfaces—e.g., the superhard material that has two bonding surfaces, and which forms two wear-resistant surfaces, may have two or more thickness measurements that correspond to the thicknesses between the respective bonding surfaces and a point on each of the wear-resistant surfaces.

The wear-resistant surface, formed by the superhard material, may have a reduced amount of wear from operation of the injection mold 120, as compared to a surface that is not formed from superhard material. In some embodiments, the wear-resistant surface may at least in part for a surface of an injection mold component that contacts the molten molding material injected into the injection mold 120. For example, such injection mold component may be the sprue bushing 150, as illustrated in FIGS. 3A-3C. The sprue bushing 150 may include a through-hole 151, defined by inner wear-resistant surface 151wr, which may allow the molten molding material to be injected from the injection molding machine 110 into the injection mold 120. The sprue bushing 150 also may have a minor diameter 152, a major diameter 153, and a shoulder 154, which may be formed between the minor and major diameters 152, 153. One or more of the minor diameter 152, the major diameter 153, or the shoulder 154 may assist with locating the sprue bushing 150 in the injection mold 120.

The sprue bushing 150 also may include a seal-off 155, which may have a substantially hemispherical shape. Hence, the injection nozzle 117 of the injection molding machine 110 may press against the seal-off 155, to create a sealed pathway for the molten molding material, from the injection system 114 into the injection mold 120. As the material passes through the through-hole 151 of the sprue bushing 150, the wear-resistant surface 151wr may provide an improved durability and wear resistance to the molten molding material, as compared to other materials. Similarly, repeated contact between the seal-off 155 and the injection nozzle 117 may wear or damage the surface of the seal-off 155.

In one or more embodiments, the surface that defines the through-hole 151 may be at least partially formed by a wear-resistant surface 151wr. In particular, a superhard material 150sm may form the wear-resistant surface 151wr. Furthermore, the wear-resistant surface 151wr may span or cover only a portion of the through-hole 151 (FIG. 3A). In some embodiments, the superhard material 150sm that forms the wear-resistant surface 151wr may be disposed on an insert, which may be press-fitted into the sprue bushing 150. Alternatively, the superhard material 150sm may be bonded to the sprue bushing 150 directly or through the substrate, as described above.

In at least one embodiment, the wear-resistant surface 151wr may span or cover the entire through-hole 151 (FIGS. 3B and 3C). Thus, in some embodiments, the wear-resistant surface 151wr may reduce wear (resulting from flow of molten molding material through the through-hole 151) on part of the through-hole 151 of the sprue bushing 150 (FIG. 3A). Alternatively, in other embodiments, the wear-resistant surface 151wr may reduce such wear along the entire surface of the through-hole 151 (FIGS. 3B and 3C).

Additionally or alternatively, the sprue bushing 150 also may have a wear-resistant surface 155wr disposed along the seal-off 155. The wear-resistant surface 155wr may reduce the amount of wear associated with repeated contacts of the injection nozzle 117 with the seal-off 155. Accordingly, the wear-resistant surface 155wr may extend life of the sprue bushing 150. In some embodiments, at least a portion of the injection nozzle 117 may comprise superhard material.

The wear-resistant surface 155wr may cover the entire seal-off 155. In other embodiments, the wear-resistant surface 155wr may cover only a portion of the seal-off 155. Moreover, the same superhard material 150sm that may form the wear-resistant surface 151wr may also form the wear-resistant surface wear-resistant surface 155wr. Alternatively, different separate bodies of superhard material may form the wear-resistant surfaces 151wr and 155wr. Also, as described above, the superhard material 150sm may have varied and varying thicknesses. Furthermore, the superhard material 150sm also may cover a top of the sprue bushing 150; in other words, the superhard material 150sm may extend to the major diameter 153 of the sprue bushing 150 (FIG. 3C).

Figure 3D:
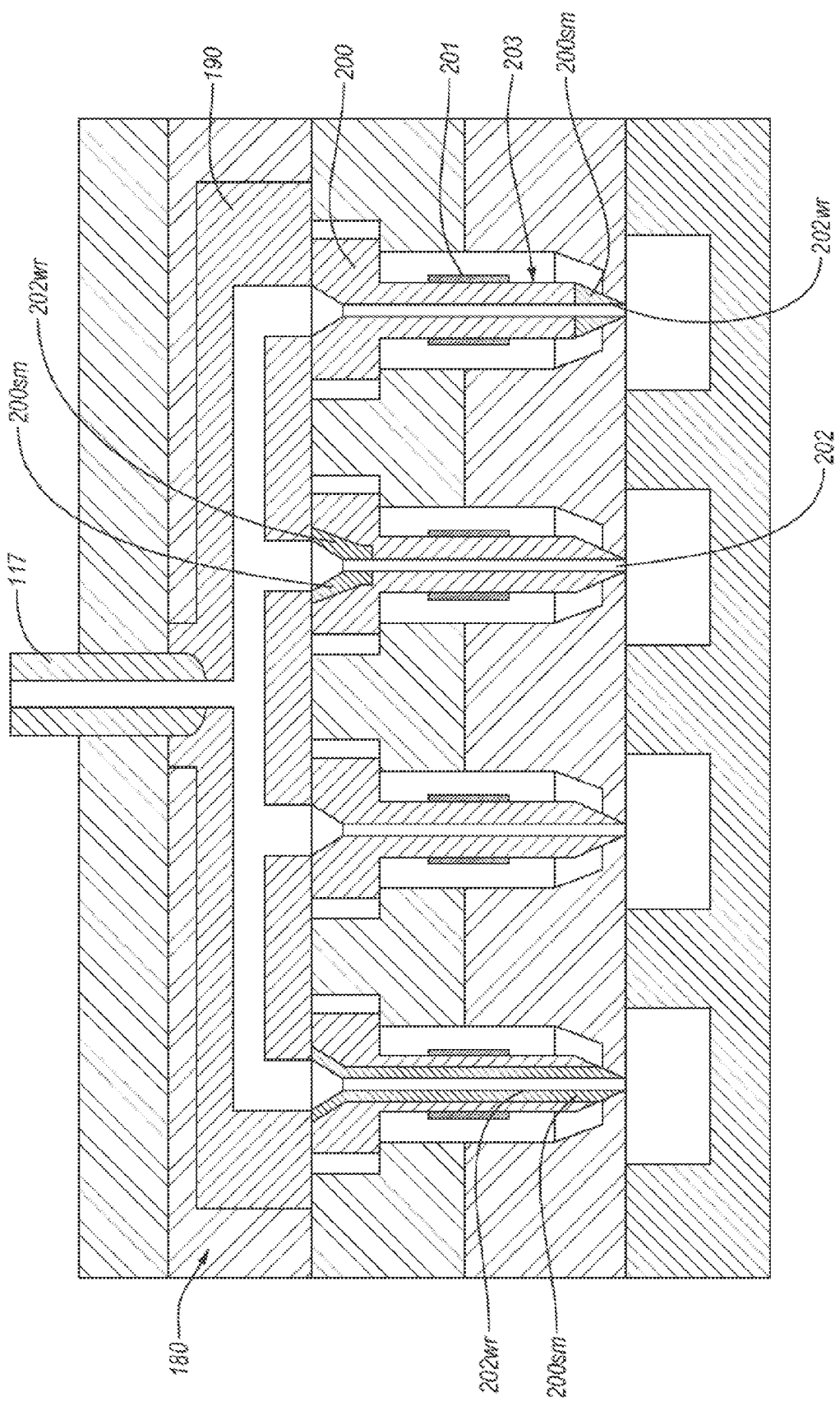
FIG. 3D is a cross-sectional view of a hot runner system and various hot tips in accordance with one embodiment of the invention.

In some embodiments, as illustrated in FIG. 3D, in lieu of or in addition to a sprue bushing, the manufacturer may use a hot runner system 180, which may include a runner manifold 190 and one or more tip inserts 200. The molten molding material may enter the hot runner system 180 through the sprue bushing. In some embodiments, the sprue bushing may incorporate one or more heating elements and may also include one or more wear-resistant surfaces, as described above. Alternatively, the injection nozzle 117 may seal off against the runner manifold 190 of the hot runner system 180. Accordingly, the molten molding material from the injection molding machine 110 may directly enter the runner manifold 190 of the hot runner system 180 through the injection nozzle 117. Generally, one or more embodiments may include one or more of the injection nozzles 117, runner manifolds 190, and tips inserts 200 comprising a superhard material. More particularly, any surface (or a portion thereof) of the injection nozzle injection nozzles 117, runner manifolds 190, and tips inserts 200 that contacts molten molding material may comprise a superhard material.

The hot runner system 180 may have one or more heater elements (not shown), which may help maintain the molding material in at least partially molten state within the hot runner system 180. Similarly, the tip inserts 200 also may include heating elements 201 that may keep the molding material in at least partially molten state within the tip inserts 200. The tip inserts 200 also may include an opening 202, which may allow the molten molding material to flow into the molding volume 131 (FIG. 1). In other words, the opening 202 may provide a channel for the molten molding material to flow from the runner manifold 190 of the hot runner system 180 into the molding volume 131, defined by one or more molding elements 140 (FIG. 1).

In some embodiments, the opening 202 may be at least partially defined by a wear-resistant surface 202wr. As described above, a superhard material 200sm may form the wear-resistant surface 202wr. Furthermore, the wear-resistant surface 202wr may span an entire length of the opening 202 or may only partially cover the surface of the opening 202. For example, the wear-resistant surface 202wr may be disposed proximate to a connection point between the tip insert 200 and runner manifold 190 (i.e., proximate to the point where the molten molding material from the runner manifold 190 enters the tip insert 200). Alternatively, the wear-resistant surface 202wr may be disposed proximate a material exit point of the tip inserts 200 (i.e., proximate to the point where the material exits the tip insert 200 and enters the molding elements 140.

Additionally, in at least one embodiment, the tip inserts 200 also may have an outer portion 203 that includes one or more wear-resistant surfaces 203wr. For instance, the wear-resistant surface 203wr may be disposed proximate to an end (i.e., to the exit point) of the tip insert 200. Moreover, the superhard material 200sm that forms the wear-resistant surface 202wr also may form the wear-resistant surfaces 203wr. As described above, the superhard material 200sm that forms the wear-resistant surface 202wr and/or wear-resistant surfaces 203wr may be bonded to a substrate that is bonded to the tip inserts 200, may be deposited onto a surface of the tip inserts 200, and/or may form part of an insert that is bonded or mechanically secured to one or more of the tip inserts 200.

Figure 3E:
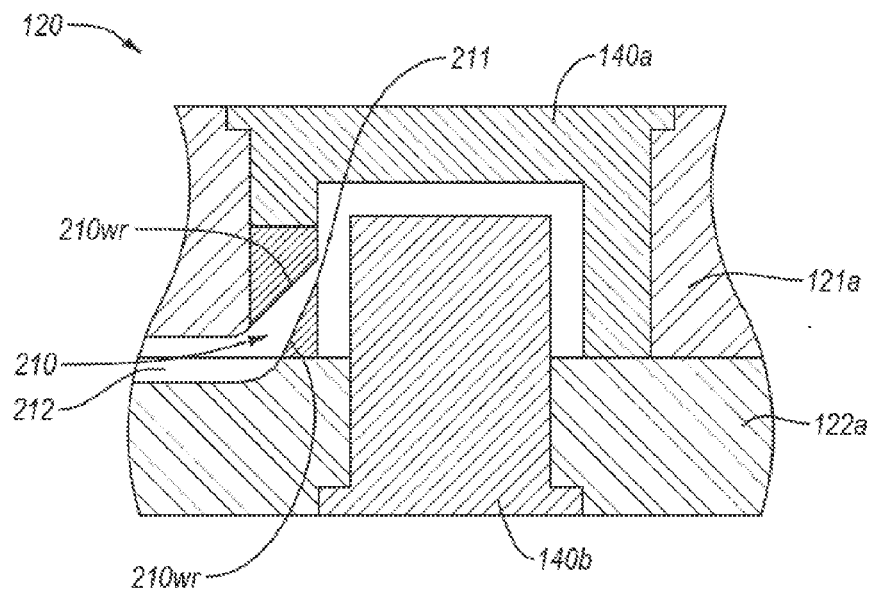
FIG. 3E is a cross-sectional view of a gate insert of an injection mold in accordance with one embodiment of the invention.

In some instances, the part 130 (FIG. 2) molded in the injection mold 120 may be direct-gated—i.e., a runner or the sprue bushing 150 may provide a direct pathway for the molten molding material into the molding volume 131. Alternatively, the molding elements 140 may incorporate a tunnel gate 210, illustrated in FIG. 3E. Hence, a runner 212 may connect with the tunnel gate 210 and channel the molding material into the molding volume 131 (FIG. 1). As described above, flow of the molten molding material may wear the surfaces of the 210 and/or runner 212. Furthermore, as the injection mold 120 opens and/or as the part 130 is ejected from the molding element 140a or molding element 140b, the molding material in the tunnel gate 210 may be sheared off by an edge 211 of the tunnel gate 210. Thus, repetitive shearing of the molding material by the edge 211 of the tunnel gate 210 may wear, dull, and/or damage the edge 211, which may result in subnormal damage to the final part 130.

In at least one embodiment, the surface of the tunnel gate 210 may include a wear-resistant surface 210wr, which may be formed by a superhard material 210sm. The wear-resistant surface 210wr may cover the entire surface of the tunnel gate 210 or only a portion thereof. In some embodiments, the edge 211 of the tunnel gate 210 also may comprise superhard material. Moreover, the superhard material 210sm material that forms the wear-resistant surface 210wr, also may form the edge 211 of the tunnel gate 210.

Similar to the above-described superhard material, the superhard material 210sm forming the wear-resistant surface 210wr and/or the edge 211 of the tunnel gate 210 may be bonded to a substrate that is bonded to the injection mold component (e.g., to an injection mold plate and/or to one of the molding elements 140). The superhard material 210sm also may be bonded directly to the injection mold component. Alternatively, the tunnel gate 210, at least partially, may be formed by a gate insert. Accordingly, the gate insert may incorporate the superhard material. In particular, the gate insert may comprise a substrate to which a superhard material may be bonded; the gate insert also may comprise steel or other metallic material to which the substrate with the superhard material 210sm may be bonded; or the gate insert may comprise steel or other metallic material and a bonded superhard material 210sm.

Figures 4A, 4B:
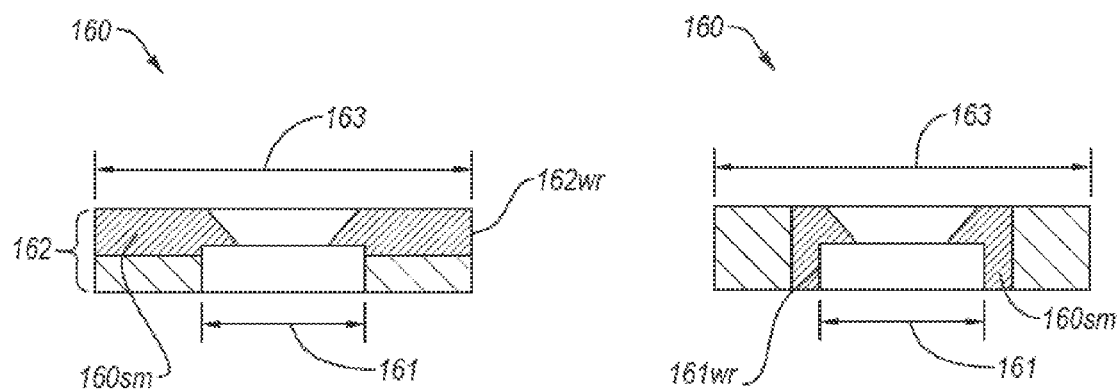
FIG. 4A is a cross-sectional view of a locating ring of an injection mold in accordance with one embodiment of the invention.
FIG. 4B is a cross-sectional view of a locating ring of an injection mold in accordance with another embodiment of the invention.

In one or more embodiments, the injection mold 120 may include injection mold components that have surfaces in contact with other injection mold components (e.g., sliding surfaces that incorporate one or more wear-resistant surface formed by superhard material). For example, as illustrated in FIGS. 4A and 4B, the locating ring 160 (FIG. 2) may include a locating inside diameter 161 that may fit over the major diameter 153 of the sprue bushing 150. Accordingly, the locating ring 160 may be aligned with the sprue bushing 150. Hence, the locating ring 160 may be used to align the injection mold 120 within the injection molding machine 110, such that the injection nozzle 117 of the injection molding machine 110 may substantially align with the sprue bushing 150.

In particular, in one embodiment, the locating ring 160 may have an outside diameter 163 that may fit into an opening of substantially the same diameter in the front platen 111 of the injection molding machine 110. Thus, a peripheral surface 162 of the locating ring 160 may contact the surface (or a portion thereof) of the corresponding opening in the front platen 111 of the injection molding machine 110. In some embodiments, the surface defining the peripheral surface 162 may be formed as or may incorporate a wear-resistant surface 163wr, which may be formed by superhard material 160sm. Accordingly, the wear-resistant surface 163wr may have less wear and or deterioration from repeated contact with the corresponding opening in the front platen 111 (as compared with a steel surface forming the outside diameter 163).

Additionally, the surface of the locating inside diameter 161 of the locating ring 160 may contact the surface of the sprue bushing 150 that defines the major diameter 153. In some embodiments, the surface of the locating inside diameter 161 may be formed as or may incorporate a wear-resistant surface 161wr, which may be formed by one or more layers of superhard material 160sm. Accordingly, the wear-resistant surface 161wr may exhibit reduced wear or deterioration. It should be noted that the same superhard material 160sm may form the wear-resistant surface 161wr and wear-resistant surface 163wr.

In some instances, a surface of an injection mold component (sliding surface) may have relative sliding motion in contact with a surface of another injection mold component (stationary surface). In other words, the surface of a first injection mold component may slide in contact with the surface of a second injection mold component (one or both surfaces may be moving during such sliding motion). For example, as described above, the ejector pins 170 may be moved by the ejector plates 122d toward the front platen 111 of the injection molding machine 110, thereby ejecting the part 130 out of the injection mold 120. As the ejector pins 170 move, the outside surface of the ejector pins 170 (e.g., surface of the outside diameter of the ejector pins 170) may slide or contact with the surface of corresponding openings in the molding elements 140 (e.g., in the molding element 140b).

The contact between the opening and the ejector pins 170 may wear the ejector pins 170 and/or the openings in the molding elements 140. Such wear may result in flashing—i.e., molten molding material flowing between the surfaces of the ejector pins 170 and the corresponding openings in the molding elements 140. For instance, as illustrated in FIGS. 2, 5A-5E, the molding elements 140 may incorporate an ejector sleeve 220 (e.g., ejector sleeves 220a, 220b shown in FIG. 2), which may have one or more wear-resistant surfaces or surface segments. Such ejector sleeve 220 may be secured in one or more of the molding elements 140 (e.g., in the molding element 140b) and may, in part, form one or more surfaces of the molding elements 140 that at least in part defines the molding volume 131 (FIG. 1).

The ejector pins 170 may pass through an opening 221 of the ejector sleeve 220 and eject the part 130. Alternatively, the ejector sleeve 220 may be secured to the ejector plates 122d and the opening 221 may fit around a core pin (e.g., the core pin may be secured in the ejector housing 122c). Accordingly, in some embodiments, such ejector sleeve 220 also may, at least in part, move toward the front platen 111 of the injection molding machine 110 to eject the part 130. In additional or alternative embodiments, the ejector pin 170 also may include a superhard material 170sm. For example, a tip of the ejector pin 170 may incorporate superhard material 170sm, which may form a wear-resistant surface 170wr.

In one or more embodiments, the opening 221 may include a fitted portion 222 and a relieved portion 223. The fitted portion 222 may have a close fit with the ejector pins 170 or with the core pin, as applicable. For instance, the ejector pin 170 may be a cylindrical pin. Hence, the opening 221 may have a substantially cylindrical shape. Furthermore, ejector sleeve 220 may have a clearance between the internal diameter of the opening 221 and the outside diameter of the ejector pin 170 in the range of about 0.01 mm to about 0.15 mm. The relieve portion 223 of the opening 221 may have a clearance that is greater than 0.15 mm between the internal diameter of the opening 221 and the outside diameter of the ejector pin 170.

Whether stationary with respect to the ejector pins 170 (e.g., secured to the molding element 140b) or movable with respect to a core pin (e.g., secured in the ejector plates 122d), the ejector sleeve 220 may include a wear-resistant surface 221wr, which may be formed by a superhard material 220sm. The wear-resistant surface 221wr may extend along and cover the entire fitted portion 222 or a part of the fitted portion 222 of the opening 221. The wear-resistant surface 221wr also may cover the entire relieved portion 223 or a part of the relieved portion 223 of the opening 221.

Furthermore, the superhard material 220sm that forms the wear-resistant surface 221wr may have various thicknesses, as described above. For example, the superhard material 220sm may have a thickness that is less than the distance from the wear-resistant surface 221wr to an outer dimension of the ejector sleeve 220 (e.g., a thickness defined between the inside diameter of the opening 221 and an outside diameter 225 of the ejector sleeve 220). The superhard material 220sm may be bonded to the ejector sleeve 220 in the same manner as described above in connection with other injection mold components.

Additionally, as described above, a portion of the ejector sleeve 220 may form part of one or more molding elements 140. In particular, a front face 224 of the ejector sleeve 220 may form part of the molding element 140b, which may contact at least a portion of the part 130 (FIG. 2). Thus, the front face 224 may experience wear caused by the flow of molten molding material in contact with the front face 224. Accordingly, the ejector sleeve 220 also may include a wear-resistant surface 224wr. The same superhard material 220sm that may form the wear-resistant surface 221wr, also may form the wear-resistant surface 224wr. The wear-resistant surface 224wr may cover all or a portion of the front face 224 of the ejector sleeve 220 and/or ejector pin 170.

Figure 5A:
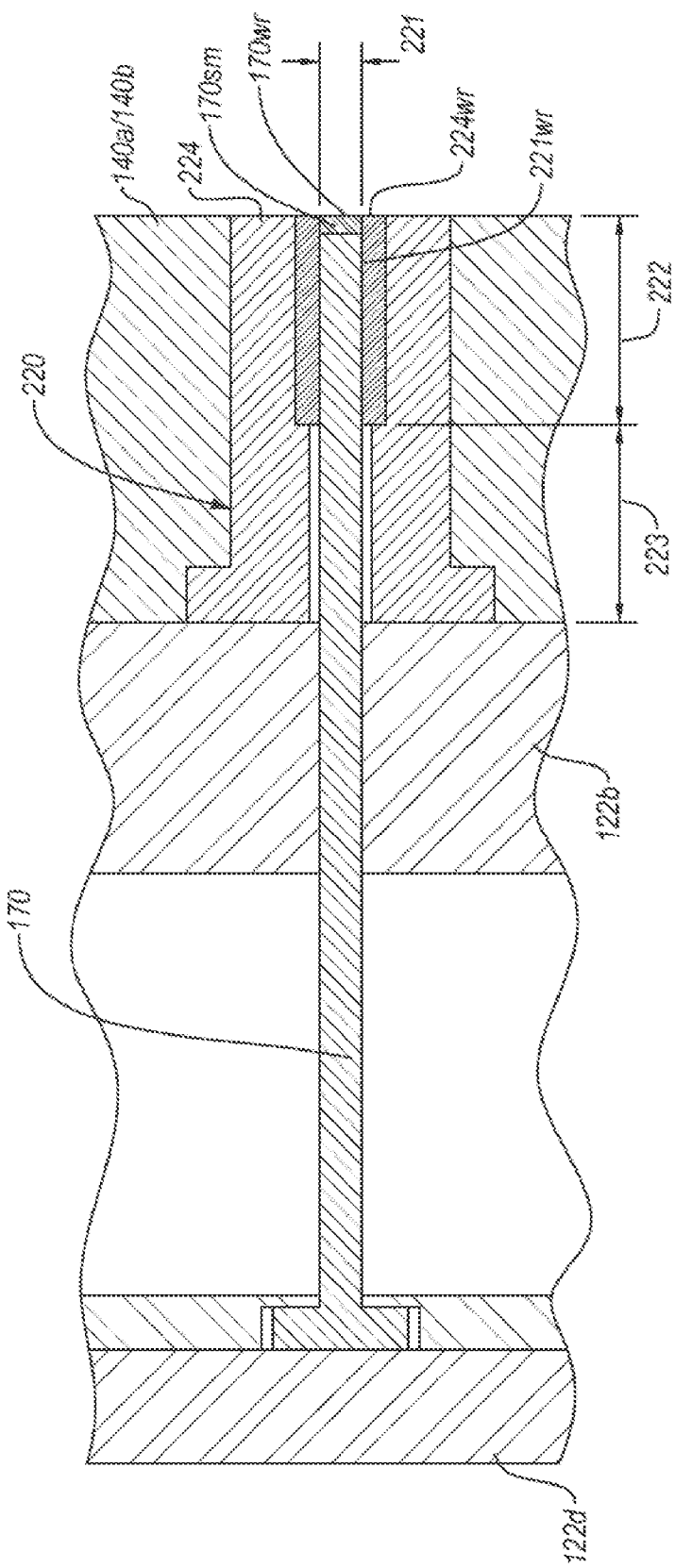
FIG. 5A is a cross-sectional view of an ejector sleeve of an injection mold in accordance with one embodiment of the invention.
Figure 5B:
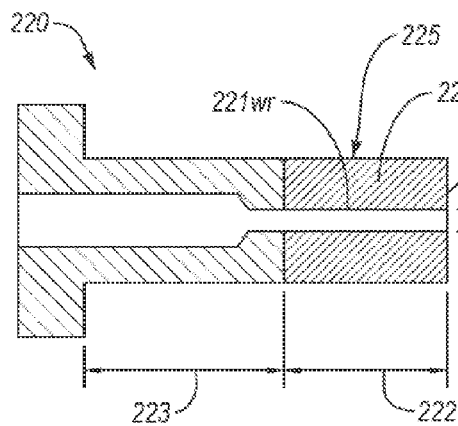
FIG. 5B is a cross-sectional view of an ejector sleeve of an injection mold in accordance with another embodiment of the invention.
Figure 5C:
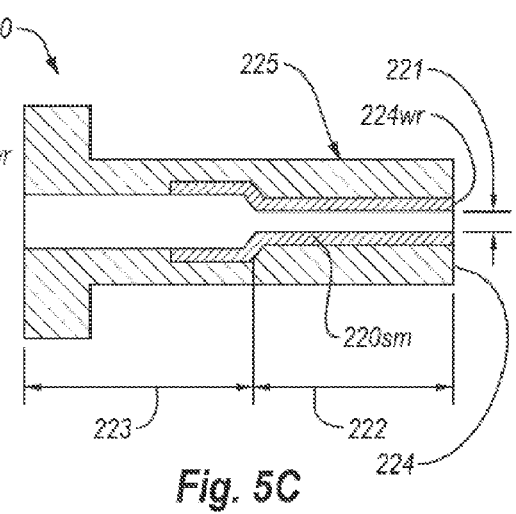
FIG. 5C is a cross-sectional view of an ejector sleeve of an injection mold in accordance with yet another embodiment of the invention.
Figure 5D:
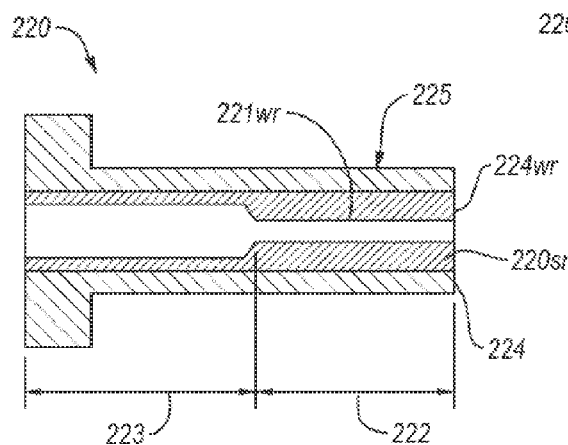
FIG. 5D is a cross-sectional view of a different embodiment of an ejector sleeve of an injection mold in accordance with one embodiment of the invention.
Figure 5E:
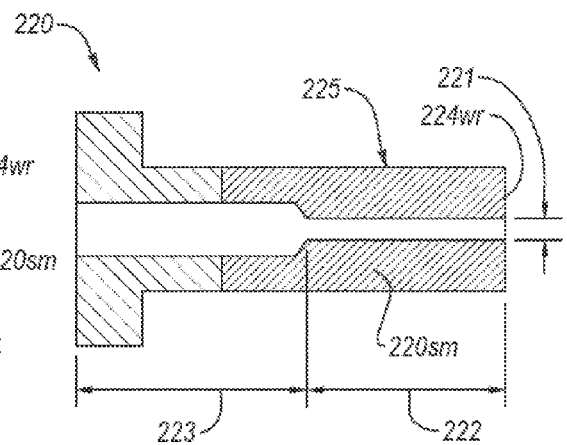
FIG. 5E is a cross-sectional view of yet another embodiment of an ejector sleeve of an injection mold in accordance with one embodiment of the invention.

Additionally, as described above, thickness of the superhard material 220sm may vary, at least in part, based on the direction of the measurement. For instance, the thickness of the same superhard material 220sm may be measured from the wear-resistant surface 221wr as well as from wear-resistant surface 224wr. Moreover, thickness of the superhard material 220sm may be measured only from one of the wear-resistant surfaces 221wr, 224wr. More specifically, thickness of the superhard material 220sm (as measured from the wear-resistant surface 224wr) may be such as to cover part of the fitted portion 222 of the opening 221 (FIG. 5B). Alternatively, thickness of the superhard material 220sm may be such as to cover all of the fitted portion 222 and part of the relieved portion 223 of the opening 221 (FIG. 5E).

As described above, the ejector sleeve 220, such as the ejector sleeve 220b (FIG. 2) may move with respect to the core pin. In addition to contact that may occur between the ejector sleeve 220 and the core pin, the outside diameter 225 of the ejector sleeve 220 also may slide in contact with one or more molding elements 140 (e.g., within an opening of the molding element 140b). Accordingly, the surface formed by the outside diameter 225 of the ejector sleeve 220 may experience wear associated with such sliding. In at least one embodiment, a wear-resistant surface 225wr, which may cover all or part of the surface formed by the outside diameter 225 of the ejector sleeve 220, may reduce such wear (FIGS. 5B and 5E). Furthermore, the wear-resistant surface 225wr may be formed by the same body superhard material 220sm that may form the wear-resistant surface 221wr and/or wear-resistant surface 224wr.

As described above, in some instances, the molding elements 140 may form or may have undercutting portions, such that the undercut must be relieved in order to eject the part 130 from the injection mold 120. For example, as illustrated in FIGS. 6A-6G, the injection mold 120 may include an undercut relief system 230. In at least one embodiment, the undercut relief system 230 may include a slide body 240 and a heel lock 250. The slide body 240 may secure one or more of the molding elements 140 (e.g., a core 140d).

The core 140d may form an undercutting portion of the part 130. For example, the core 140d may form a hole or a ledge in the part 130. Before ejecting the part 130, the slide body 240 may move the core 140d out of the formed hole, thereby allowing the part 130 to be ejected. While the injection mold 120 is in the closed position, an angular portion 251 of the heel lock 250 may contact a corresponding angular portion 241 of the slide body 240, which may aid in maintaining the slide body 240 in a desired position.

Accordingly, to relieve or release the undercutting portion, such as the core 140d, when the injection mold 120 opens, an angle pin 260 may force the slide body 240 to move away from the part 130 (before the part 130 is ejected from the injection mold 120). More specifically, as the injection mold 120 opens, the moving portion 122 (which may include the second plate 122a and the support plate 122b) move away from the nonmoving portion 121 (which may include the first plate 121a and the top clamping plate 121b). The part 130 and the slide body 240 may remain on the moving portion 122; the slide body 240 may be restricted from movement away from the moving portion 122 by one or more gibs (not shown; see FIG. 6B-6G), which may guide the slide body 240. The slide body 240 also may have a single degree of freedom of motion, to slide away from the part 130 (e.g., along the second plate 122a). Thus, as the slide body 240 moves away from the nonmoving portion 121, which secures the angle pin 260. Hence, as the slide body 240 moves with respect to the angle pin 260, the slide body 240 is forced to slide away from the part 130.

In at least one embodiment, the angular portion 241 of the slide body 240 may have a wear-resistant surface that covers the entire or a part of the angular portion 241. For example, a superhard material 240sm, as described above, may form all or part of the surface of the angular portion 241. Accordingly, the surface of the angular portion 241 may have reduced wear (compared with another material, such as steel) from contact with the angular portion 251.

Additionally or alternatively, the heel lock 250 also may incorporate a superhard material 250sm, which may form a wear-resistant surface on at least a part of the surface of the angular portion 251. In some embodiments, the wear-resistant surface of the angular portion 251 may have a lower hardness than the wear-resistant surface of the angular portion 241. Alternatively, the wear-resistant surface of the angular portion 251 may have substantially the same or higher hardness than the wear-resistant surface of the angular portion 241.

Furthermore, the angular portion 241 of the slide body 240 or the angular portion 251 of the heel lock 250 may at least partially incorporate a wearing surface. As used herein, the term "wearing" surface refers to a surface that comprises a material that is softer than the superhard material of the wear-resistant surface that is in contact with the wearing surface. Suitable materials for the wearing surface include steel, brass, bronze, copper alloys, aluminum alloys, polytetrafluoroethylene (PTFA), combinations thereof, or other suitable material. Accordingly, the wearing surface may aid in reducing the amount of wear experienced by the wear-resistant surface. For example, the wearing surface may comprise material that is softer than the superhard material that comprises the wear-resistant surface. Thus, a softer wearing surface may absorb more energy generated by friction at an interface between the wear-resistant surface and a contacting surface (e.g., the wearing surface) than by a harder contacting surface. In some embodiments, the wearing surface also may have a reduced coefficient of friction (as compare to other suitable materials). To illustrate, the angular portion 241 of the slide body 240 may include a wear-resistant surface comprising superhard material (as described above), and the angular portion 251 may have a wearing surface, which may wear more quickly or easily than the wear-resistant surface of the angular portion 241, and which may increase the life of the wear-resistant surface of the angular portion 241.

In some embodiments, the wearing surface may be removable and replaceable. For example, the wearing surface may comprise an insert that incorporates material that is softer than the wear-resistant surface that contacts the wearing surface. Hence, once the wearing surface has worn beyond an acceptable level, the insert comprising the wearing surface may be removed and replaced.

Furthermore, as the slide body 240 moves toward and away from the part 130 (or the molding elements 140 that at least in part form the part 130), the slide body 240 may be guided by one or more gibs 280 (FIGS. 6B-6G). One should note that, as described above in connection with FIG. 6A, the cross-sectional view in FIG. 6A shows a cross-section that does not pass through the gibs 280; by contrast, cross-sectional views shown in FIGS. 6B-6E show a cross-section that is orthogonal to the cross-section shown in FIG. 6A, and which passes through the gibs 280. In particular, the gibs 280 may have one or more surfaces that may prevent the slide body 240 from lifting off from a surface upon which the slide body 240 slides (e.g., a slide surface 290). For instance, the gibs 280 may have one or more retaining surfaces 281 (see FIG. 6F), which may restrict lifting off of the slide body 240. The slide body 240 also may have one or more shoulder surfaces 243, which may interface (or interfere) with the retaining surfaces 281 of the gibs 280.

Additionally or alternatively, the gibs 280 may have one or more surfaces that may control the direction of movement of the slide body 240, and which may limit deviation of the slide body 240 from such direction. In particular, the gibs 280 may have one or more side surfaces 282, 283, which may contact with one or more side surfaces 244, 245 of the slide body 240. Accordingly, the side surfaces 244, 245 of the slide body 240 may move in sliding contact with the side surfaces 282, 283 of the gibs 280, thereby guiding the slide body 240 along a desired path.

In one or more embodiments, one or more of the side surfaces 244, 245 may incorporate wear-resistant surfaces, which may cover the portion of side surfaces 244, 245 positioned within the gib 280s (e.g., FIG. 6D). It should be noted that FIG. 6D illustrates different examples of wear-resistant surfaces on the slide body 240 and on the gibs 280, which are shown differently on the left and the right sides of an assembly of the slide body 240 and gibs 280. The wear-resistant surfaces also may cover only a portion of one or more of the side surfaces 244, 245 (e.g., FIGS. 6B, 6C, and 6E). Accordingly, the side surfaces 244, 245 that incorporate, at least in part, the wear-resistant surfaces may experience reduced wear from the sliding in contact with the side surfaces 282 and/or 283 (as compared with a different material, such as steel). As described above, the wear-resistant surfaces incorporated into the side surfaces 244, 245 may be formed by a superhard material 240sm, which may be bonded to the slide body 240 through a substrate, directly, or may form part of an insert secured to the slide body 240.

Additionally or alternatively, the one or more of the side surfaces 282, 283 also may incorporate one or more wear-resistant surfaces, which may cover the side surfaces 282, 283 entirely or partially. In some embodiments, the wear-resistant surfaces formed on or incorporated into the side surfaces 282, 283 may have substantially the same hardness as the wear-resistant surface formed on or incorporated into the side surfaces 244, 245. In other embodiments, the wear-resistant surfaces formed as or incorporated into the side surfaces 282, 283 may be softer than the wear-resistant surface formed as or incorporated into the side surfaces 244, 245. Furthermore, the wear-resistant surfaces formed on or incorporated into the side surfaces 282, 283 also may be harder than the wear-resistant surface formed on or incorporated into the side surfaces 244, 245.

Moreover, the one or more wear-resistant surfaces that form one or more of the side surfaces 244, 245 or the side surfaces 282, 283, may be continuous or interrupted, as illustrated in FIGS. 6B-6G. For instance, as the gibs 280 may have multiple wear-resistant surfaces 281$wr$ and/or side surfaces 282$wr$, 283$wr$ that may at least partially form the retaining surfaces 281 and/or side surfaces 282, 283. In one or more embodiments, the wear-resistant surfaces 281$wr$, 282$wr$, 283$wr$, or combinations thereof may comprise discrete surface segments, formed by multiple discrete layers or bodies of superhard material. Alternatively, the wear-resistant surfaces 281$wr$, 282$wr$, 283$wr$, or combinations thereof may be formed by a single layer or body of superhard material that has variable thickness to form raised portions, forming the wear-resistant surfaces 281$wr$, 282$wr$, and/or 283$wr$.

In one or more embodiments, one or more of the side surfaces 282, 283 of the gibs 280 may incorporate or may be formed as wearing surfaces, which have a substantially lower hardness than the wear-resistant surfaces. Thus, one or more of the side surfaces 244, 245 that may be formed as or incorporate wear-resistant surfaces may experience further reduced wear. Alternatively, the side surfaces 244, 245 of the slide body 240 may be formed as or may incorporate wearing surfaces, which may come into contact with wear-resistant surfaces formed as or incorporated into the side surfaces 282, 283.

Additionally or alternatively, the slide body 240 may have a bottom sliding surface 246, which may slide in contact or across a top surface 291 of a slide plate 290. The slide plate 290 may be incorporated into or secured to a plate comprising the nonmoving portion 121 or moving portion 122 of the injection mold 120. The slide plate 290 also may be incorporated into or secured to one or more of the molding elements 140.

The bottom sliding surface 246 of the slide body 240 may be formed as or may incorporate a wear-resistant surface 246$wr$. Similar to the wear-resistant surfaces described above, the wear-resistant surface 246$wr$ may be formed from a single body or multiple bodies or layers of superhard material. Moreover, the bottom sliding surface 246 may be continuous or interrupted, and the wear-resistant surface 246$wr$ may cover the entire bottom sliding surface 246 or only a part of the bottom sliding surface 246 of the slide body 240 (FIGS. 6B-6E).

The top surface 291 of the slide plate 290 also may incorporate or may be formed as a wear-resistant surface (formed by a superhard material 290$sm$). In at least one embodiment, a wear-resistant surface 291$wr$ may be incorporated into or may at least partially form the top surface 291 of the slide plate 290. For example, the wear-resistant surface 291$wr$ may cover the entire or only a portion of the top surface 291. For example, the wear-resistant surface 291$wr$ may comprise discrete surface segments (FIG. 6G). Alternatively, the wear-resistant surface 291$wr$ may comprise a unitary on continuous surface, which may be substantially level or may have raised and/or lowered portions therein.

Figure 6A:
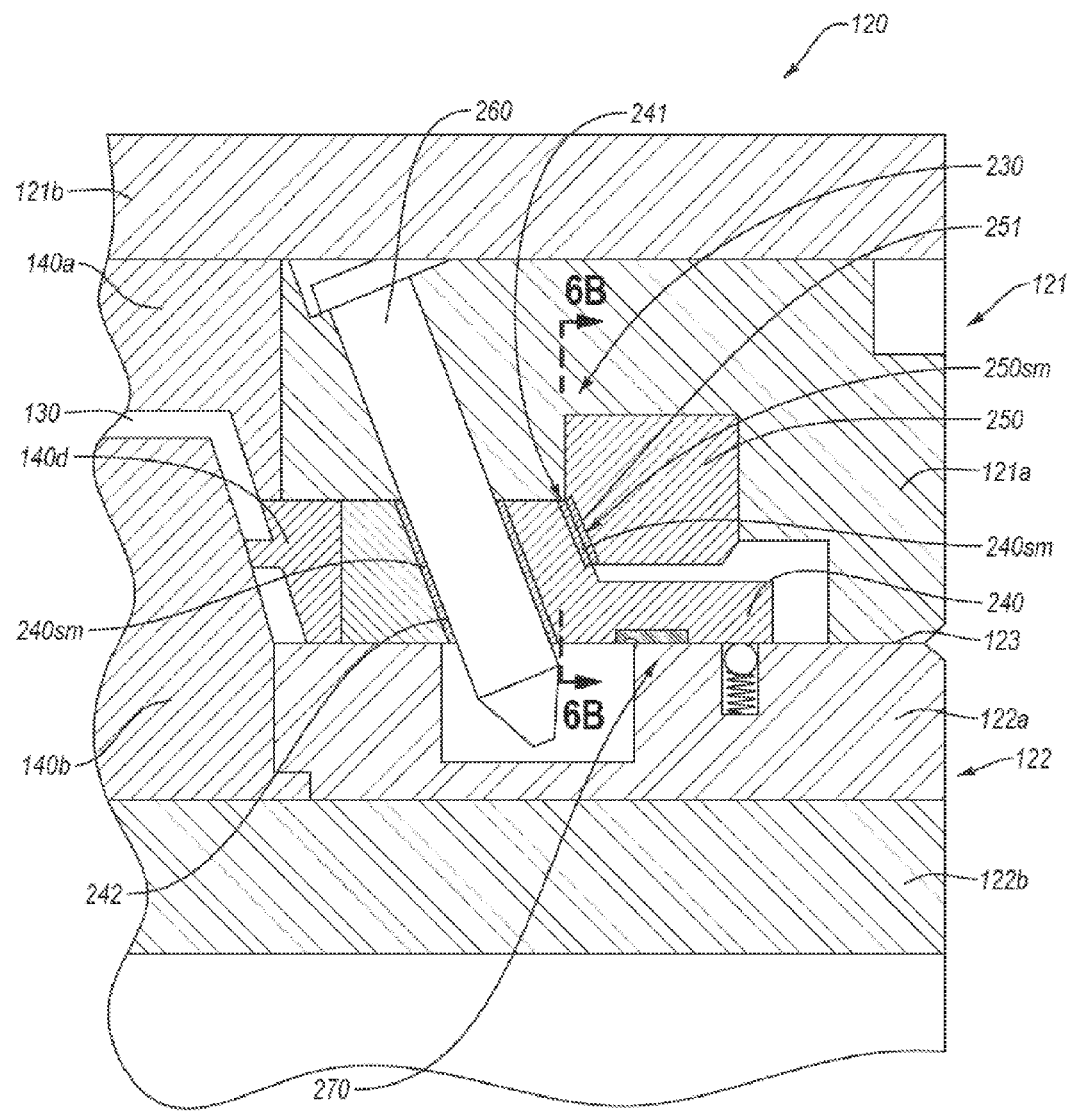
FIG. 6A is a cross-sectional view of an undercut relief system of an injection mold in accordance with one embodiment of the invention.
Figure 6F:
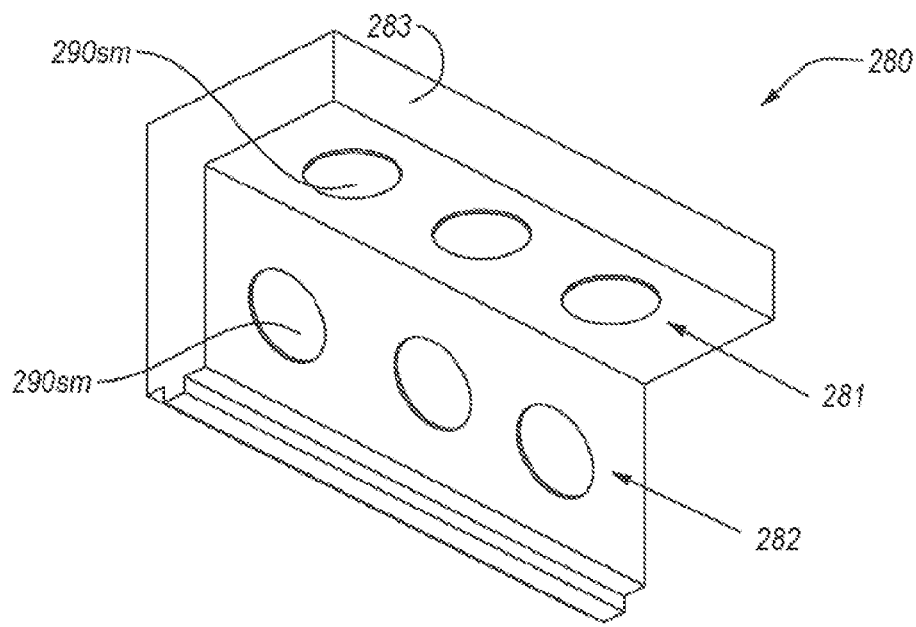
FIG. 6F is an isometric view of an undercut relief system of an injection mold in accordance with yet another embodiment of the invention.
Figure 6G:
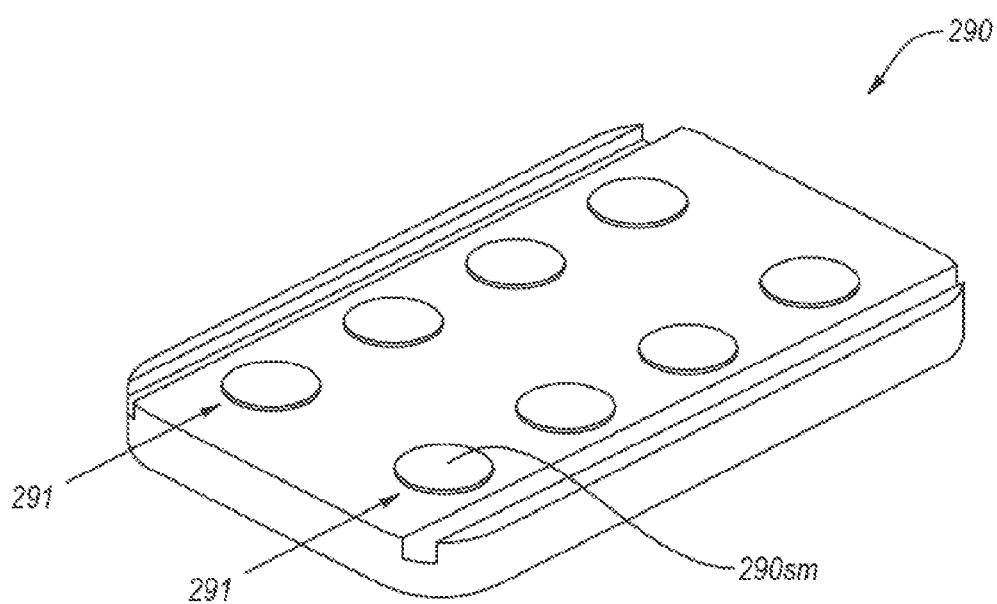
FIG. 6G is an isometric view of an undercut relief system of an injection mold in accordance with yet another embodiment of the invention.

To move the slide body 240, in some embodiments, the injection mold 120 may include the angle pin 260, which may pull the slide body 240 away from the part 130 as the injection mold 120 opens (FIG. 6A). More specifically, the angle pin 260, which may remain stationary while the moving portion 122 moves away from the nonmoving portion 121, may guide the slide body 240 away from the part 130, as the moving portion 122 (including the slide body 240) moves away from the nonmoving portion 121. Alternatively, other mechanisms may be used to move the slide body 240 away from the part 130. For instance, the slide body 240 may be moved by a cylinder (e.g., a hydraulic cylinder). Thus, as shown in FIG. 6A, the slide body 240 may have the opening 242, which may accommodate the angle pin 260 therein.

In at least one embodiment, the surface of the opening 242 and/or of the angle pin 260 may include a wear-resistant surface. For example, the wear-resistant surface may cover the entire or a part of the surface of the opening 242 in the slide body 240. The wear-resistant surface of the opening 242 may reduce the amount of wear experienced by the opening 242 from repeated entry, exit, and/or sliding movement of the angle pin 260 against the surface of the opening 242 of the slide body 240. The wear-resistant surface of the opening 242 may be formed by a superhard material 240$sm$, which may be bonded to a substrate (such substrate may in turn be bonded to the slide body 240), to the slide body 240 directly, or may comprise an insert that is secured to the slide body 240.

Figure 7A:
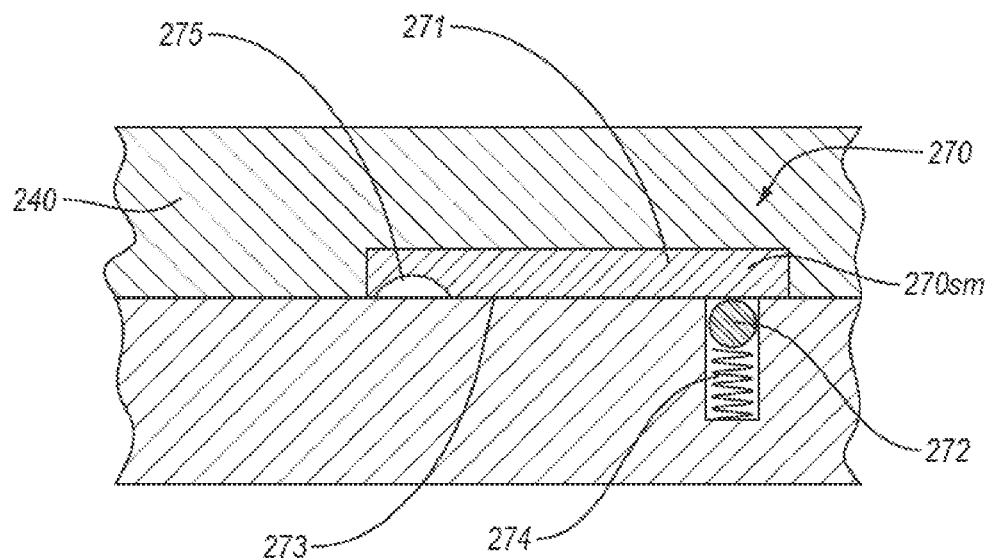
FIG. 7A is a cross-sectional view of a slide retainer in accordance with one embodiment of the invention.
Figure 7B:
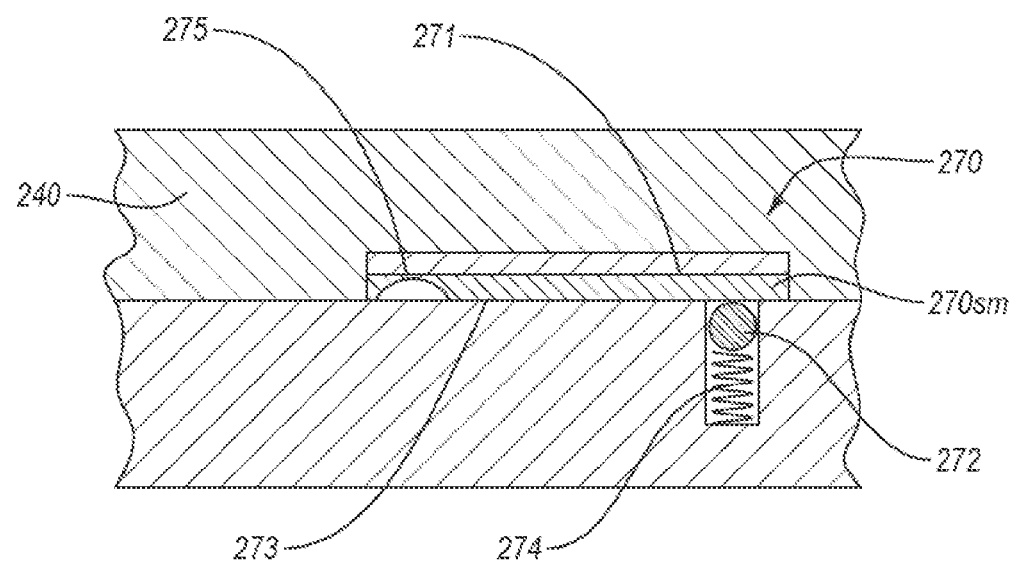
FIG. 7B is a cross-sectional view of a slide retainer in accordance with another embodiment of the invention.

Additionally, the undercut relief system 230 also may include a slide retainer 270, which may secure the slide body 240 (e.g., when the injection mold 120 is in the open position). For example, as illustrated in FIGS. 7A and 7B, the slide retainer 270 may include a slide plate 271, and a retention ball 272 and a spring 274 (i.e., a spring-loaded retention ball 272). As the slide body 240 moves away from the part 130 (or the corresponding molding elements 140 forming at least a portion of the part 130), the slide plate 271 moves past the spring loaded retention ball 272. Once the spring loaded retention ball 272 reaches a detent 275 on the slide plate 271, the retention ball 272 may maintain the slide plate 271 (and consequently the slide body 240) in a fixed position.

In some instances, movement of the retention ball 272 across (and in contact with) a bottom surface of the slide plate 271 may wear the bottom surface 273 of the slide plate 271. In at least one embodiment, the bottom surface 273 of the slide plate 271 may include or may be formed by a wear-resistant surface formed by superhard material 270$sm$. Furthermore, the wear-resistant surface may cover (or form) the entire or only a part of the bottom surface 273 of the slide plate 271, as shown in FIG. 7A. Also, superhard material 270$sm$, which may form one or more wear-resistant surfaces, may be continuous across the entire bottom surface 273 of the slide plate 271 or may be interrupted. Moreover, as shown in FIG. 7B, superhard material 270$sm$ may comprise an insert, which may be secured to the slide body 240 (e.g., with mechanical fasteners such as screws or using bonding techniques, such as welding, brazing, etc.). In some embodiments, the insert may comprise the superhard material 270$sm$ bonded to a substrate (FIG. 7B). Alternatively, the entire insert may comprise superhard material—i.e., the superhard material 270$sm$ may be an insert secured to the slide body 240.

Figure 8A:
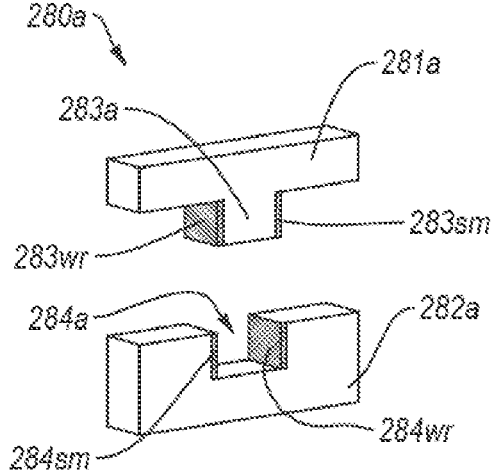
FIG. 8A is an isometric view of a rectangular two-plate interlock pair in an open position in accordance with one embodiment of this invention.

As described above, the injection mold 120 may include one or more interlock pairs 280 (FIG. 2). For example, as illustrated in FIGS. 8A and 8B, the injection mold may include one or more rectangular two-plate interlock pairs 280$a$ or interlock pairs having another suitable shape. More particularly, the rectangular single side interlock pair 280$a$ comprise a male interlock 281$a$ and a female interlock 282$a$. The male interlock 281$a$ may have a protrusion 283$a$, which may enter and substantially align with a recess 284$a$ within the female interlock 282$a$. The protrusion 283$a$ and/or the recess 284$a$ may respectively incorporate superhard material 283$sm$, 284$sm$. Accordingly, the protrusion and 283$a$ and the recess 284$a$ also may include wear resistant surfaces 283$wr$, 284$wr$, respectively.

As described above, the interlock pair, such as the rectangular single side interlock pair 280a may include small clearance on each side, between the protrusion and the recess of the respective male and female interlock portions. For instance, such clearance may be in one of the following ranges 0.0002 inches to 0.0005 inches 0.0005 inches to 0.001 inches, and 0.001 inches to 0.005 inches. Thus, as the injection mold closes, sides of the protrusion and the recess may slide in contact one with the other. In particular, the wear-resistant surface 283wr may slide in contact with the wear-resistant surface 284wr, as the protrusion 283a enters the recess 284a.

In one or more embodiments, superhard material 283sm and 284sm may form the wear-resistant surfaces 283wr, 284wr that may define the entire surface of the protrusion and the recess (as shown in FIGS. 8A and 8B) or portions thereof. Additionally or alternatively, the superhard material 283sm may form wear-resistant surfaces 283wr only on the sides of the protrusion 283a, as shown in FIG. 8A. Similarly, the superhard material 284sm may form wear-resistant surface 284wr only on the sides of the recess 284.

In additional or alternative embodiments, the superhard material 283sm, 284sm, may form the entire protrusion 283 and recess 284, as shown in FIG. 8B. Thus, the superhard material 283sm, 284sm may form other wear-resistant surfaces, in addition to the side surfaces of the protrusion 283 and the recess 284. For instance, the part material 284sm may form a bottom wear-resistant surface 284wr of the recess 284. Furthermore, as described above, superhard material 283sm, 284sm may comprise one or more inserts, which may be secured within the male interlock 281a and/or the female interlock 282a.

Figure 8C:
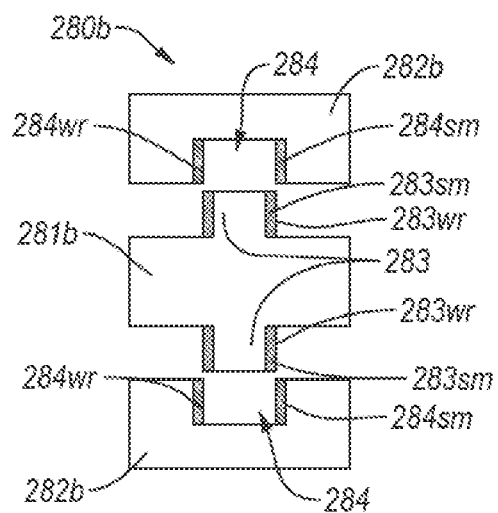
FIG. 8C is a side view of a three-plate interlock pair in an open position in accordance with one embodiment of this invention.
Figure 8B:
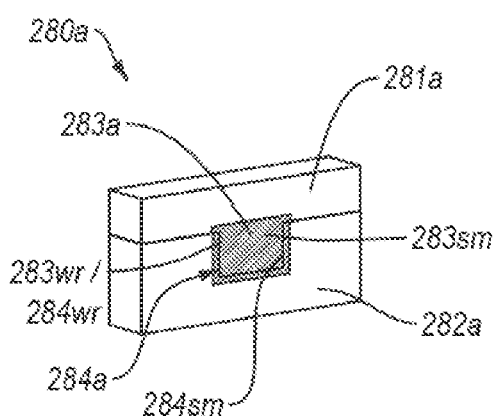
FIG. 8B is an isometric view of a rectangular two-plate interlock pair in a closed position in accordance with another embodiment of this invention.
Figure 8D:
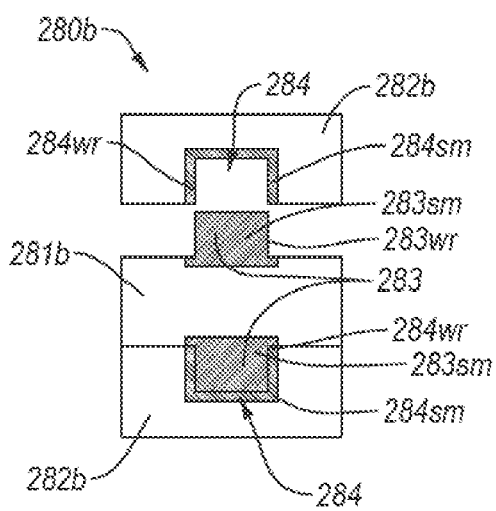
FIG. 8D is a side view of a three-plate interlock pair in a partially closed position in accordance with another embodiment of this invention.

In at least one embodiment, the injection mold may include a three-plate interlock pair 280b, as shown in FIGS. 8C and 8D, which may align three plates of the injection mold. Accordingly, the three-plate interlock pair 280b may include a male interlock 281b, which may enter into two opposing female interlocks 282b. More specifically, the male interlock 281b may include two opposing protrusions 283b, which may enter into recesses 284b of the female interlocks 282b. Similar, as described above in connection with the rectangular two-plate interlock pairs 280a (FIGS. 8A and 8B), the three-plate interlock pair 280b may incorporate superhard material 283sm, 284sm, which may form wear-resistant surfaces 283wr, 284wr of the protrusions 283 and recesses 284, respectively.

Thus, the superhard material 283sm, 284sm may form wear-resistant surfaces 283wr, 284wr only on the respective sides of the protrusions 283 and recesses 284 that contact one another (FIG. 8C). Additionally or alternatively, the superhard material 283sm, 284sm also may form wear-resistant surfaces 283wr, 284wr on other sides and/or portions of the male and female interlocks 281, 282. For instance, as shown in FIG. 8D, the superhard material 283sm, 284sm may form the entire protrusion 283 and/or recess 284, respectively.

Figure 8E:
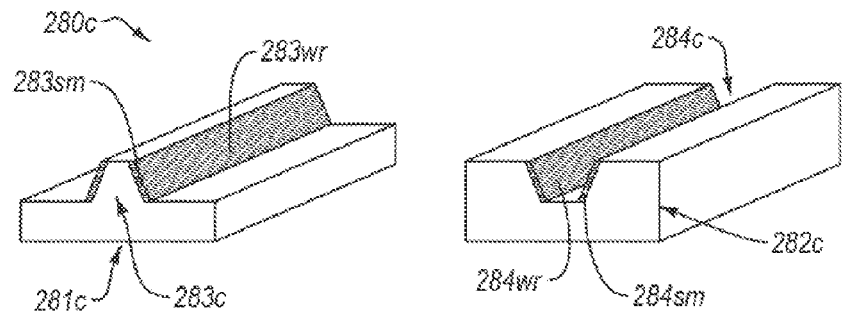
FIG. 8E is an isometric view of a tapered interlock pair in accordance with one embodiment of this invention.
Figure 8F:
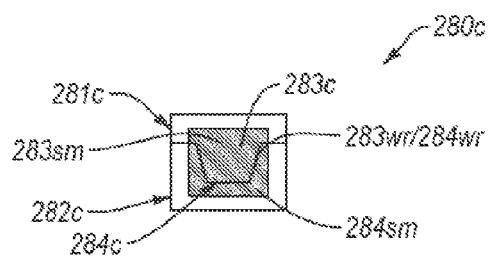
FIG. 8F is a side view of a tapered interlock pair in a closed position in accordance with another embodiment of this invention.

The injection mold also may include tapered interlocks. For instance, as shown in FIGS. 8E and 8F, the injection mold may incorporate one or more tapered interlock pairs 280c. More specifically, the tapered interlock pair 280c may comprise a male interlock 281c and a corresponding female interlock 282c. The male interlock 281c may include a tapered protrusion 283c that may enter a corresponding tapered recess 284c in the female interlock. In one or more embodiments, the tapered interlock pair 280c may include superhard material 283sm, 284sm, which may form wear-resistant surfaces 283wr, 284wr. Additionally, the superhard material 283sm, 284sm may form only the surfaces 283wr, 284wr of the respective protrusion 283c and recess 284c that may contact one another when the tapered interlock pair 280c closes, as described above (see also FIG. 8E). The superhard material 283sm, 284sm also may form the protrusion 283c and/or the recess 284c (FIG. 8F).

Figure 8G:
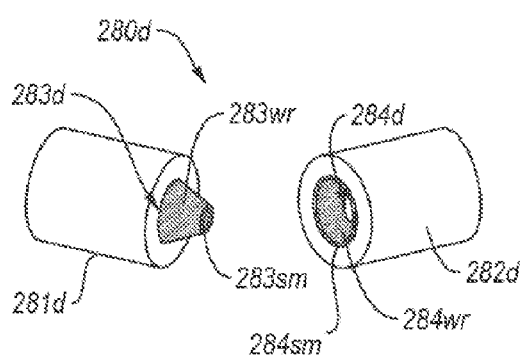
FIG. 8G is an isometric view of a cylindrical tapered interlock pair in accordance with one embodiment of this invention.
Figure 8H:
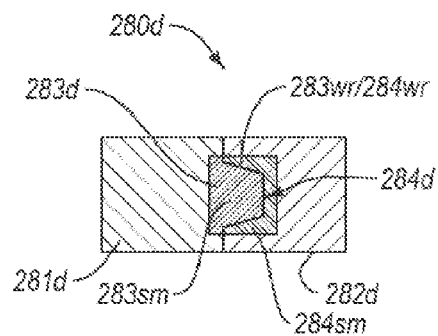
FIG. 8H is a cross-sectional view of a cylindrical tapered interlock pair in a closed position in accordance with another embodiment of this invention.

In further embodiments, the tapered interlock pair may be a cylindrical tapered interlock pair 280d, as shown in FIGS. 8G and 8H. Similarly, the cylindrical tapered interlock pair 280d may comprise a male and female interlocks 281d, 282d, which may have a corresponding protrusion 283d and recess 284d. Also, the protrusion 283 and recess 284 may include superhard material 283sm, 284sm, respectively, which may form wear-resistant surfaces 283wr, 284wr. As described above, the wear-resistant surfaces 283wr, 284wr may form only the one or more surfaces of the respective protrusion and recess 283, 284 that may contact one another when the cylindrical tapered interlock pair 280d closes (FIG. 8G). Additionally or alternatively, the superhard material 283sm, 284sm may form the respective protrusion and/or recess 283, 284 (FIG. 8H).

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed:

1. An injection mold component for use in an injection mold assembly, the injection molding component comprising:
    an injection molding element including a superhard material defining a wear-resistant surface, the superhard material including sintered polycrystalline diamond having a plurality of bonded diamond grains defining a plurality of interstitial regions, at least a portion of the plurality of interstitial regions including a catalyst therein.

2. The injection mold component of claim 1 wherein the catalyst includes a metal-solvent catalyst.

3. The injection mold component of claim 1 wherein the superhard material is at least partially leached of the catalyst.

4. The injection mold component of claim 1 wherein the superhard material includes one or more segments defining at least a portion of the wear-resistant surface.

5. The injection mold component of claim 1 wherein the superhard material defines a substantially continuous layer.

6. The injection mold component of claim 1 wherein the superhard material exhibits a variable thickness.

7. The injection mold component of claim 1, further comprising a cemented carbide substrate bonded to the superhard material.

8. The injection mold component of claim 1 wherein the superhard material is secured to a portion of the injection mold component using at least one of mechanical fasteners, welding, press fitting, or brazing.

9. The injection mold component of claim 1 wherein the wear-resistant surface defines at least a portion of a surface of at least one of an ejector sleeve, an ejector pin, a slide body, or a sprue bushing.

10. The injection mold component of claim 1 wherein the wear-resistant surface defines at least a portion of a surface of at least one of a hot runner system, a tunnel gate, a locating ring, an undercut relief system, or a slide retainer.

11. The injection mold component of claim 1 wherein at least one of:
- the wear-resistant surface is moveable within the injection mold assembly; or
- the wear-resistant surface defines at least a portion of a conduit for communicating a molding material into the injection mold assembly.

12. An injection mold assembly, comprising:
- a first mold plate;
- a second mold plate;
- one or more molding elements located on one or more of the first or second mold plates; and
- an injection mold component at least partially located on or in at least one of the first mold plate, the second mold plate, or the one or more molding elements, the injection mold component including:
  - a superhard material defining a wear-resistant surface, the superhard material including sintered polycrystalline diamond having a plurality of bonded diamond grains defining a plurality of interstitial regions, at least a portion of the plurality of interstitial regions including a catalyst therein.

13. The injection mold assembly of claim 12 wherein the catalyst includes at least one metal-solvent catalyst.

14. The injection mold component of claim 12 wherein the superhard material includes one or more segments defining at least a portion of the wear-resistant surface.

15. The injection mold assembly of claim 12 further comprising a cemented carbide substrate bonded to the superhard material.

16. The injection mold assembly of claim 12 wherein:
- the superhard material at least partially defines an insert; and
- the insert is connected to the injection mold component.

17. The injection mold assembly of claim 12 wherein at least one of:
- the wear-resistant surface is moveable within the injection mold assembly; or
- the wear-resistant surface defines at least a portion of a conduit for communicating a molding material into the injection mold assembly.

18. An injection mold press, comprising:
- an injection mold assembly including:
  - a first mold plate;
  - a second mold plate;
  - one or more molding elements located on one or more of the first or second mold plates; and
  - an injection mold component at least partially located on or in at least one of the first mold plate, the second mold plate, or the molding element, the injection mold component including:
    - a superhard material defining a wear-resistant surface, the superhard material including sintered polycrystalline diamond having a plurality of bonded diamond grains defining a plurality of interstitial regions, at least a portion of the plurality of interstitial regions includes a catalyst therein; and
  - an injection system operably coupled to the injection mold assembly, the injection system configured to convey the material into the mold cavity of the injection mold assembly.

19. The injection mold press of claim 18 wherein the superhard material includes one or more segments defining at least a portion of the wear-resistant surface.

20. The injection mold press of claim 18 wherein at least one of:
- the wear-resistant surface is moveable within the injection mold assembly; or
- the wear-resistant surface defines at least a portion of a conduit for communicating a molding material into the injection mold assembly.

* * * * *